(12) United States Patent
Fitzgerald et al.

(10) Patent No.: US 12,238,698 B2
(45) Date of Patent: Feb. 25, 2025

(54) POINTING SCHEDULER FOR A POINTABLE DEVICE

(71) Applicant: BAE SYSTEMS Information and Electronic Systems Integration Inc., Nashua, NH (US)

(72) Inventors: Patrick D. Fitzgerald, Mont Vernon, NH (US); Zachary C. Long, Redmond, WA (US); David P. Kelly, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 393 days.

(21) Appl. No.: 17/707,361

(22) Filed: Mar. 29, 2022

(65) Prior Publication Data

US 2023/0319809 A1    Oct. 5, 2023

(51) Int. Cl.
*H04W 72/121*    (2023.01)
*H04W 72/0446*    (2023.01)

(52) U.S. Cl.
CPC ..... *H04W 72/121* (2013.01); *H04W 72/0446* (2013.01)

(58) Field of Classification Search
CPC ........................ H04W 72/121; H04W 72/0446
See application file for complete search history.

(56) References Cited

U.S. PATENT DOCUMENTS

| | | | |
|---|---|---|---|
| 2013/0128271 A1* | 5/2013 | Smith | G01N 21/3504 356/437 |
| 2021/0112647 A1* | 4/2021 | Coleman | H05B 45/12 |

* cited by examiner

*Primary Examiner* — Duc C Ho
(74) *Attorney, Agent, or Firm* — Maine Cernota & Curran; Gary McFaline

(57) ABSTRACT

A method of determining a schedule for a pointing device includes distributing targets among a plurality of groups and assigning schedules to the groups, after which the groups and group schedules are not modified. A partial pointing schedule is successively grown by selecting a list of remaining groups, and appending a best candidate sub-schedule for the list to the partial schedule. If a sub-schedule cannot be found for which the grown partial schedule meets all applicable requirements, the partial schedule is pruned to a previous state and a different, previously evaluated sub-schedule is appended to the pruned partial schedule to attempt re-growth. Groups, group schedules, lists, and sub-schedules can be selected according to values, dwell times, and/or windows of performance of the targets, groups, and sub-schedules. If no schedule is found that meets all requirements, a missed group can be excluded from the schedule.

21 Claims, 14 Drawing Sheets

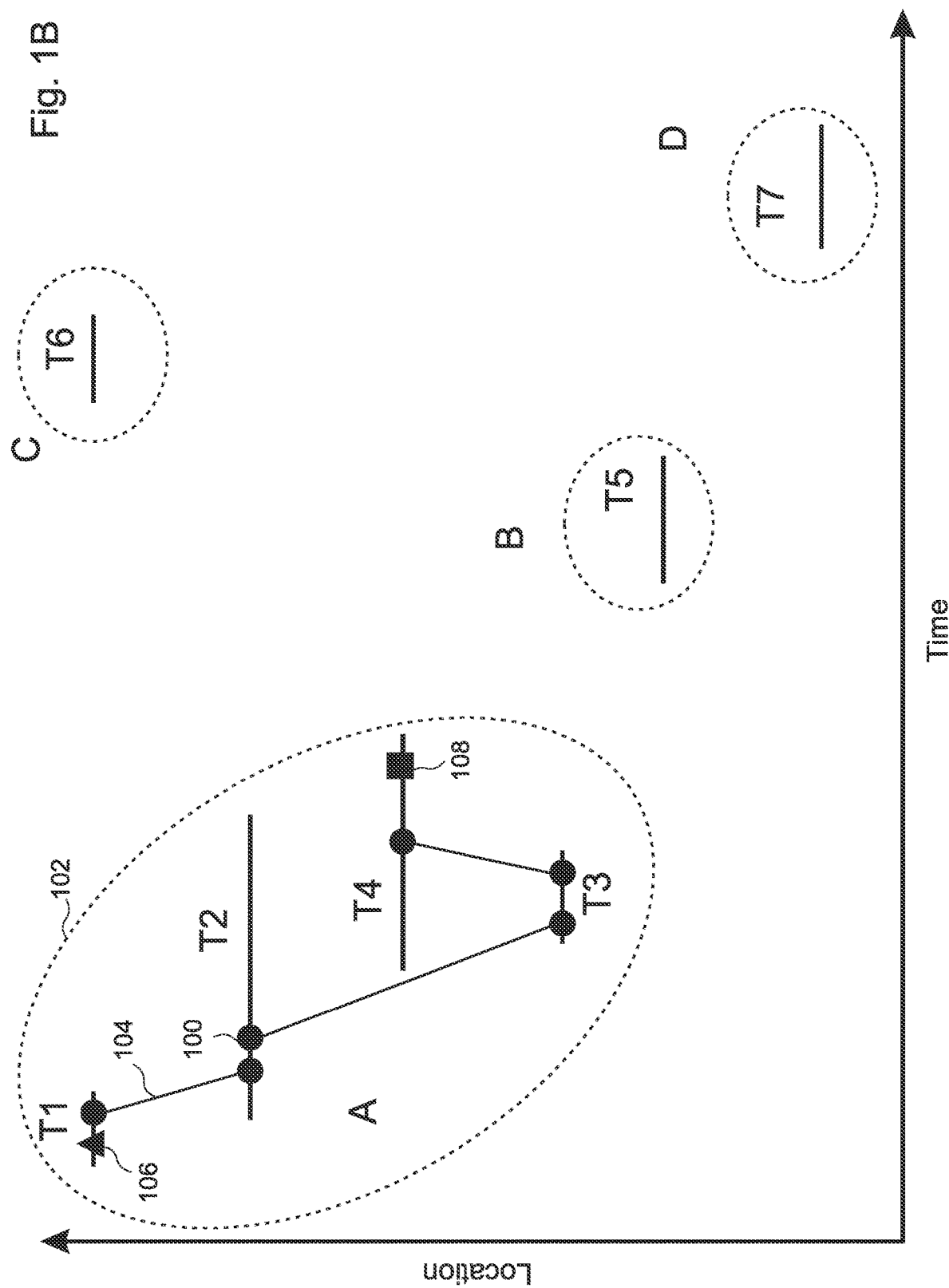

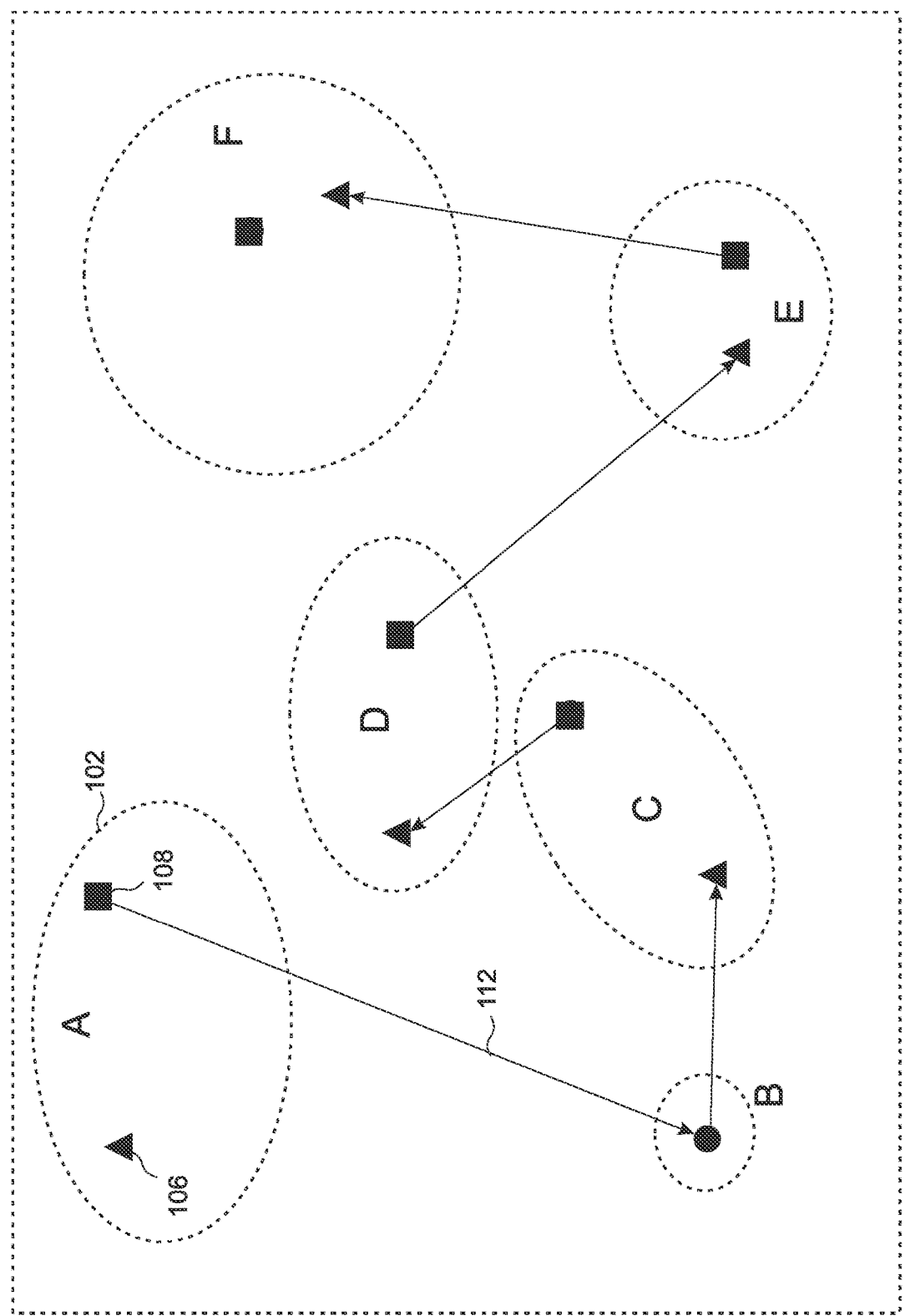

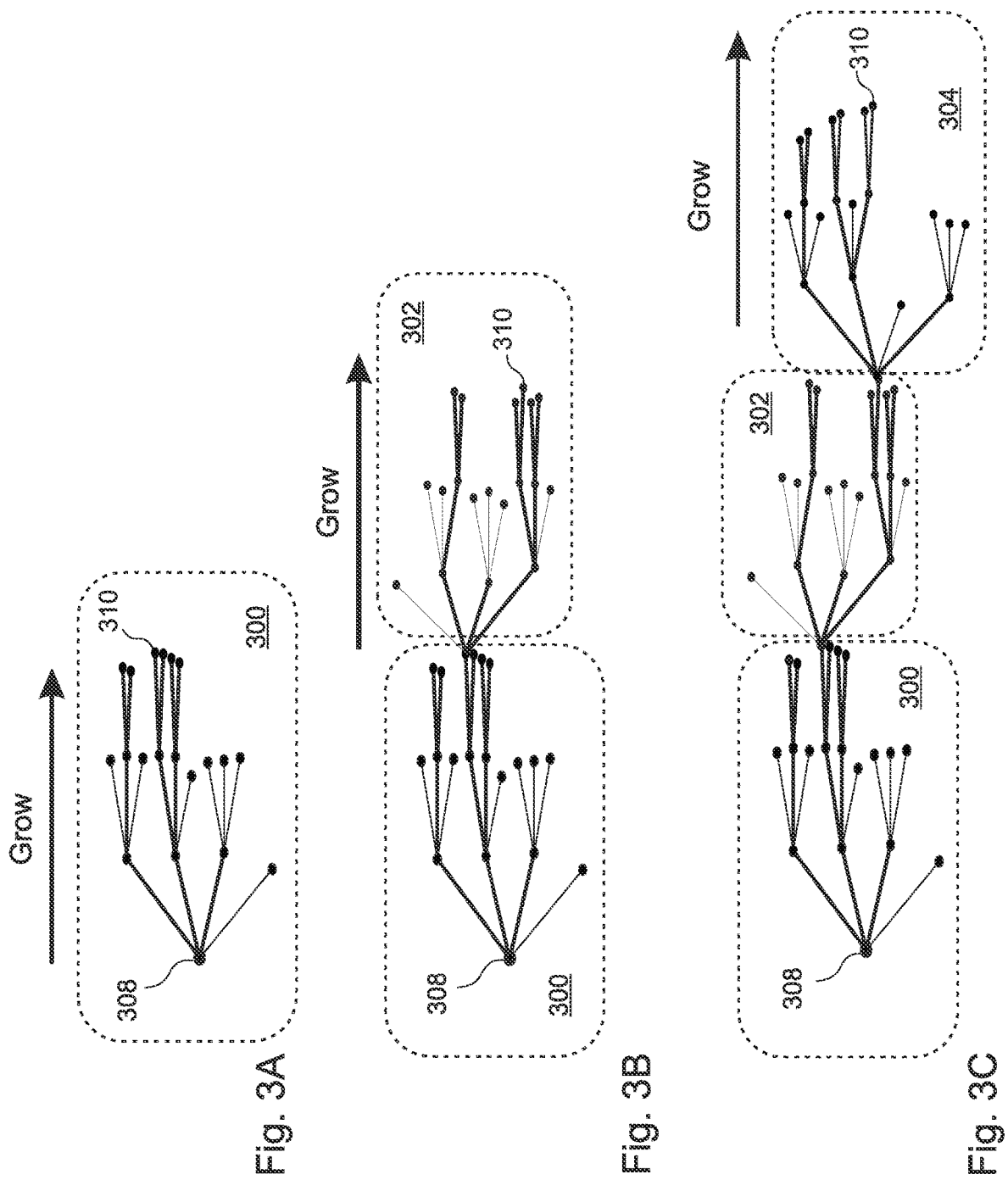

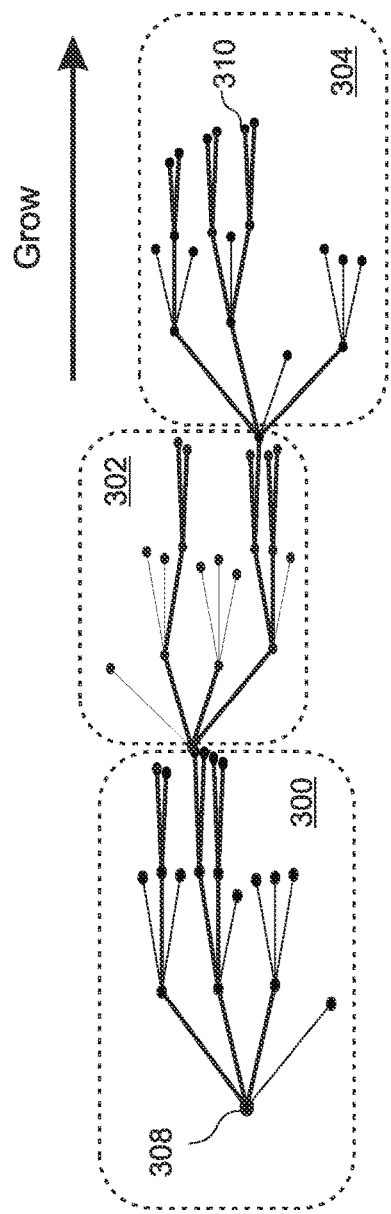
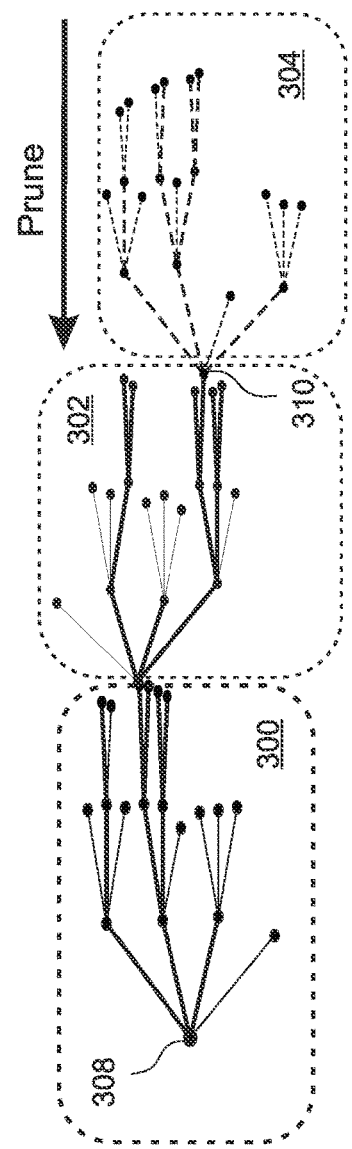
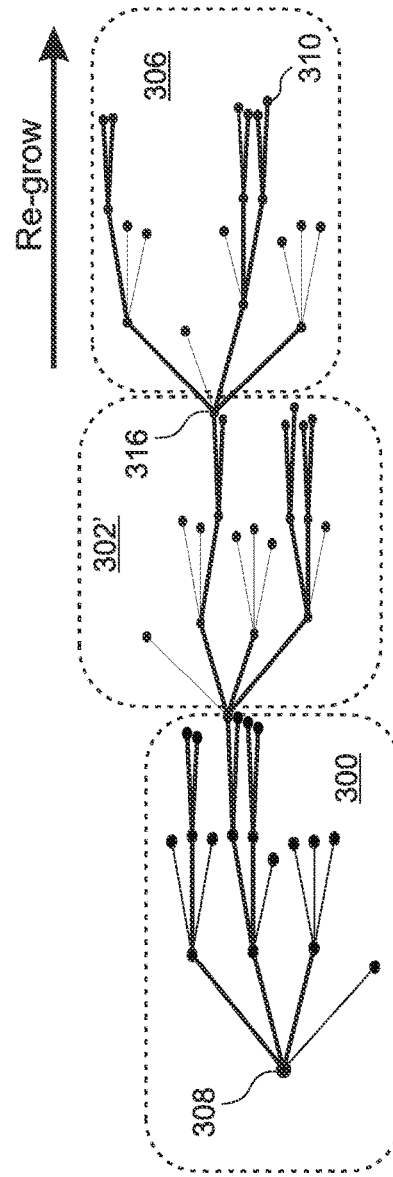
Fig. 3D
Fig. 3E
Fig. 3F

POINTING SCHEDULER FOR A POINTABLE DEVICE

FIELD

The present disclosure relates to pointable devices, and more particularly, to pointing schedulers for pointable devices.

BACKGROUND

There are many types of apparatus that require "pointing," i.e. orientation of part or all of the device in a specified target direction. Examples of pointable devices include laser communication devices, such as ground to satellite, satellite to ground, and satellite to satellite laser communication systems; astronomical telescopes; satellite imaging devices; and anti-ballistic laser systems, including anti-ballistic systems that employ Risley prism high demand optical axis pointing devices, to name a few.

In some cases, it is necessary for a pointable system to be redirected between a plurality of target directions, referred to herein as a pointing "queue," according to an optimized "pointing schedule." For example, a ground-based laser communication system may be required to point at each of a plurality of orbiting satellites within a defined time period, so as to upload and/or download required information. Or it may be desirable for an astronomical telescope to obtain observations of a plurality of celestial objects that require pointing of the telescope in a corresponding plurality of directions. If the list of celestial objects is long and telescope time is at a premium, then it may be desirable to redirect the telescope according to an optimized pointing schedule. Similarly, it may be desirable for a camera included in a satellite to be redirected to capture images of a plurality of ground targets according to a specified pointing schedule as the satellite passes over the ground targets.

Typically, there will be a period of time, or at least a maximum amount of time, within which the pointing schedule can be determined. Also, a "window of performance" will typically apply to each target in a target queue, where the window of performance is a time range within which it is necessary to begin pointing at the target. For example, it is only possible for a telescope to point at an astronomical target when the target is in view of the telescope, and not for example, below the horizon. Similarly, a camera included in a satellite can only capture images of a ground target when the satellite is more or less directly above the ground target. There are, of course, exceptions where windows of performance do not apply. For example, a satellite that is in a geosynchronous orbit will always have the same field of view, such that ground targets within that field of view will always be available for imaging. Nevertheless, it is assumed herein that windows of performance apply to all of the targets in the target queue. In cases such as a geosynchronous satellite, the windows of performance are considered to be infinitely long.

It may also be desirable to repeatedly point at one or more of the targets in a target queue, where a separate window of performance will apply to each of the desired pointing events.

A "dwell time" will be associated with each of the targets that are included in a pointing queue. For example, a ground-based laser communication device will need to remain pointed at a satellite until a specified dwell time has elapsed that is sufficient to complete a required exchange of information. These dwell times may differ for each of the satellites included in the pointing schedule. Similarly, a camera mounted to an astronomical telescope may require a different exposure time for each of the pointing targets in a pointing queue, for example due to differences in the brightness of the targeted celestial objects.

In addition to dwell times, a plurality of "slew times" will also be relevant to a pointing schedule. Unlike dwell times, which will apply separately and individually to each of the targets, each of the slew times represents the amount of time that is needed to redirect the pointable device from one target to another. As such, a distinct slew time will apply to each possible pair of source and destination targets. Often, the slew times will be proportional, at least in part to angular differences between pointing directions. For example, the time that is required to reorient an astronomical telescope between two pointing directions will typically depend upon the magnitude of the angle between the two pointing directions, as well as any time required to verify that the telescope has been correctly set to the new pointing direction.

Sometimes, the slew time will be dependent, at least in part, on a relative spatial separation between two targets. For example, after obtaining an image of a first target, a satellite may need to travel in orbit sufficiently far to be above a second target. Often, the slew times will be smaller for transitions between targets that are "close" to each other in pointing direction and/or in spatial location, while slew times for transitions between targets that are "far" from each other in terms of pointing direction and/or spatial location, will be comparatively greater.

In the present disclosure, it is assumed that all of the dwell times and windows of performance that are applicable to a target queue are known in advance of generating a pointing schedule, as well as any information that may be needed to calculate slew times between targets, and any time constraints that will apply to the schedule as a whole.

Generally, a pointing schedule will be determined by a computing device, referred to herein as a "pointing device scheduler," according to a scheduling algorithm. Once the pointing schedule is generated, it may be conveyed to the pointable device electronically by any means known in the art, or it may even be input manually into the pointable device.

In some cases, it may not be possible to perform all of the redirections that are desired within applicable time constraints, and according to any applicable windows of performance that may apply to the targets. For example, an anti-aircraft weapon may not be able to destroy all of a group of incoming hostile aircraft before they arrive. In such cases, the optimal pointing schedule may simply be the schedule that include as many as possible of the targets in the target queue. In other cases, there may be additional criteria that apply. For example, different "weights" or "values" may apply to each of the pointing targets, i.e. some targets may be more important than others. Accordingly, the optimal pointing schedule may be the schedule that achieves the highest "value," i.e. the greatest possible total of the weights of the targets that are included in the schedule, even at the expense of being unable to point at one or more lower value targets within the required timeframe.

In various cases, it may be important that a pointing schedule be generated as quickly as possible. For example, if it is necessary for an anti-ballistic weapon to react quickly to incoming missiles, spending more time optimizing a pointing schedule after the incoming missiles are detected will reduce the remaining time that is available for the antiballistic weapon to take action before the missiles arrive. Accordingly, there may be trade-offs between the degree of optimization of a pointing schedule and the time that is required to generate the pointing schedule. It can therefore be important that an acceptable pointing schedule is generated as quickly as possible.

One way to create a pointing schedule is to implement an "exact" approach that exhaustively examines and "scores" all possible pointing schedules, and then selects the one with the highest total value, and/or the shortest schedule completion time. This approach can be practical when there are only a few targets. For example, this approach may be practical when the number of targets N is approximately 8 or fewer. However, the number of possible schedules increases rapidly with N, typically according to N-factorial (N!). Even with a relatively powerful computing device, the exact approach rapidly becomes impractical as N increases.

Other approaches that can be applied when all of the targets are of equal value include applying various heuristic and approximation algorithms, such as the multi-fragment algorithm or the "nearest neighbor" algorithm. However, these approaches may still not provide an acceptable schedule within an acceptable amount of calculation time.

What is needed, therefore, is a method executable by a pointing device scheduler that is able to produce acceptable pointing schedules for a target queue within acceptable computation times according to the relative directions of the targets, their dwell times, their relative weights, and their windows of performance, as well as any other time constraints that may apply.

SUMMARY

The present disclosure includes a method executable by a pointing device scheduler that is able to produce acceptable pointing schedules for a target queue within acceptable computation times according to the relative directions of the targets, their dwell times, their relative weights, and their windows of performance, as well as any other time constraints that may apply.

According to the present disclosure, the pointing device scheduler partitions the targets of a target queue into a plurality of groups. In some embodiments, the targets for each group are selected according to their angular and/or physical "distances" from each other. In other words, each group can include a plurality of targets that are "close" to each other in angular and/or physical distance, so that the slew times within each group will be minimized. In other embodiments, targets that have overlapping or closely adjacent windows of performance are included in the same group. In still other embodiments, the targets that are selected for each group have similar weights or values. For example, if the target values range from 1-100, then a first group could include all targets having weights between 90 and 100, a second group could be all targets having weights between 80 and 90, and so forth. Embodiments may combine a plurality of these approaches, for example by partitioning the targets into larger intermediate sets according to their windows of performance, and then partitioning the intermediate sets selecting smaller groups according to their angular and/or spatial positions and value ranges.

It should be noted that if all of the targets in a target queue are considered to have the same value, then they can all be considered to have a weight of 1, such that the effective weight of each group will be equal to the number of targets included in the group. It should also be noted that if it is desirable to repeatedly point at a target A in a target queue, where a separate window of performance applies to each of the desired pointing events, then for scheduling purposes the target is treated as if it were a plurality of targets, in other words, target A becomes targets A1, A2, A3, etc., where the numerals indicate the windows of performance that are applicable to each repetition of the pointing at target A. In general, the targets A1, A2, etc. can be assigned to the same or to different groups according to their windows of performance, or according to other criteria.

Once the pointing targets have been partitioned into groups, the groups are separately examined and a "group schedule" is determined for each of the groups that includes more than one target. In each case, the group schedule begins at a group beginning target and ends at a group ending target. In various embodiments, at least one of the groups includes only one pointing target, such that the single target is both the starting point and the ending point of the group, and the group schedule for the group is trivially simple.

If a group includes only a small number of targets, then in embodiments an "exact" analysis may be applied to determine the most efficient schedule for the group. For larger groups, embodiments assign the group schedules either randomly, or according to a specified criteria or strategy, some of which are described in more detail below.

An effective dwell time for each of the groups is defined as the total of the slew times and dwell times of the group schedule, and the effective "value" of each group is defined as the total of the weights of all of the targets in the group. The slew time between a pair of groups is defined as the slew time between the ending target of one group (the "source" group) and the beginning target of the other group (the "destination" group). It is notable that the slew time from group A to group B will, in general, be different from the slew time from group B to group A.

Once the groups have been defined and the group schedules have been determined, the groups and their associated group schedules remain unchanged throughout the remainder of the scheduling process. Creation of a schedule for the entire target queue thereby only requires determining the order in which the groups will be included in the schedule. This is accomplished according to a multi-step "grow" and "prune" approach, wherein successively longer "partial" schedules are formulated, until an acceptable, complete pointing schedule is determined.

At the beginning of each step in the grow and prune process, an attempt is made to grow a previously established "partial schedule" by appending to it a new "sub-schedule" so as to formulate a new, longer partial schedule. However, each newly formulated partial schedule must meet applicable criteria. Failing that, the partial schedule is "pruned," as is described in more detail below. Examples of applicable criteria can include a minimum total value for the partial schedule, a maximum execution time for the partial schedule, and/or a requirement that no groups are "missed," i.e. for all groups that are not yet included in the partial schedule, the window of performance of the group extends beyond the execution time for the partial schedule.

The partial schedules always begin at the beginning time of the schedule, and are "hypothetical" in nature, in that they are tentative, and may be subsequently changed by "pruning" during the grow and prune process before the schedule is implemented. Of course, at the start of the first step in the grow and prune process, there is no previously established partial schedule. Accordingly, the "pending partial schedule" at the beginning of the first step can be considered to be a zeroth partial schedule that contains no groups, but may provide an "origin" for the schedule that serves as its "end group" for purposes of growing the zeroth partial schedule to a first partial schedule.

At each step of the grow and prune process, one or more of the groups that have not yet been incorporated into the partial schedule are selected as a "list" of groups to be examined for the next growth step. If the list includes more than one group, then possible sub-schedules that connect the ending group of the pending partial schedule with at least some of the groups in the list are examined and compared. The "best" of the examined sub-schedules is then appended to the previously established partial schedule to create a new, "grown," partial schedule. An execution time and cumulative value for each partial schedule can be determined in the same manner as described above for determining the effective dwell time and effective value of an individual group.

The "best" sub-schedule for each list is determined "locally" i.e. without reference to the pending partial schedule. It can be chosen according to the effective values of the sub-schedules, the execution times of the sub-schedules, ratios of effective values over execution times, the most "efficient" satisfaction of the windows of performance, or any combination of these and/or other criteria.

In each step of this growth process, all of the groups in the pending list may be added to the partial schedule, or only a subset of the groups in the list may be added. For example, it may be decided that each step in the growth process will add three groups to the partial schedule. If the current list includes five groups, then the "best" sub-schedule that includes three of the groups will be added to the partial schedule. However, if the pending list includes three or fewer groups, then all of them will be added to the partial schedule.

In other embodiments, the number of groups in a list is determined according to the total execution time of the partial schedule, the windows of performance of the targets in the groups, and a specified time increment. For example, if a partial schedule has an execution time of one hour, and a time increment of 10 minutes is specified, then a new list may include all groups having windows of performance that overlap the period between one hour and one hour plus 10 minutes.

A similar approach can be applied in embodiments to choose the number of groups from a list that will be included in a sub-schedule. For example, if a 10 minute time interval is specified, then the sub-schedules for the list can be limited to only sub-schedules having execution times that do not exceed 10 minutes.

Various requirements can be applicable to the partial schedules. For example, it may be required that no group is "missed," i.e. that all the groups in the pending partial schedule are scheduled to be performed within their window of performance, and all remaining unscheduled groups have at least some portion of their windows of performance after the hypothetical ending time of the pending partial schedule. Another possible requirement is that the execution time of a partial schedule should not exceed a specified maximum. Yet another possible requirement is that a partial schedule must have a "score" that is above a specified minimum, where the score is determined according to both the effective value of the partial schedule and the execution time of the partial schedule. For example, the score for a partial schedule might be a ratio of its effective value to its execution time, expressed as a fraction in units of inverse minutes.

If, during this growth process, a partial schedule fails to meet its applicable requirements, then other previously examined sub-schedules for the current list are substituted in the partial schedule. If no sub-schedule for the pending list can be found that will enable the grown partial schedule to meet all of its requirements, then the partial schedule is "pruned," in that the most recently added sub-schedule is removed from the partial schedule, thereby reverting the partial schedule to its previous status before the most recent growth step. The partial schedule is then modified by replacing the most recently added sub-schedule with another of those that were previously examined, and the growth process resumes.

If each successive partial schedule is numbered, and the lists are correspondingly numbered, then pruning reverts partial schedule "n" back to partial schedule "n−1." It will be noted that, at this point, a plurality of sub-schedules for list n−1 will have already been examined and ranked as "best," second best, etc. Accordingly, it is not generally necessary after pruning to evaluate additional sub-schedules for list n−1. Instead, the "next best" of the sub-schedules that were previously examined for list n−1 is used to re-grow the partial schedule from n−1 back to n', where partial schedule n' is a "new" n'th partial schedule, and a determination is made as to whether the new partial schedule n' satisfies the applicable requirements. If none of the previously examined sub-schedules for list n−1 enables partial schedule n' to meet its requirements, then the partial schedule is further pruned to "n−2" and the process is repeated.

This process of pruning the partial schedule provides a mechanism for modifying earlier choices to see if the modified choices can lead to a partial schedule that satisfies all of its appliable requirements. For example, the result of pruning may be pointing at some targets earlier than had appeared "best" when considering the sub-schedules for list n−1, but nevertheless lead to a "better" partial schedule n' that satisfies all applicable requirements.

As is noted above, it may not always be possible to include all of the groups in a schedule. If, during this pruning process, no partial schedule can be found within a reasonable computation time that includes the missed group while meeting all of its requirements, then as a last resort the missed group will be "excluded" from the schedule and the grow and prune process will continue without further consideration of the excluded group.

The disclosed process of growing, pruning, and excluding can be stated symbolically as follows. If a number is assigned to each successive partial schedule and list, and a letter is assigned to each of the sub-schedules that is considered for each list, then a partial schedule resulting from four steps of growth can be represented as 1a 2a 3a 4a, where "2a" refers to the second partial schedule and to the sub-schedule "a" that was ranked as the "best" of the examined sub-schedules for list 2. Accordingly, if the partial schedule 1a 2a 3a 4a fails to satisfy its applicable requirements, then as a first step the other previously examined sub-schedules for list 4 are considered for substitution. For example, a new partial schedule 1a 2a 3a 4b is considered to determine if it meets applicable requirements, followed by 1a 2a 3a 4c etc.

If it is found that none of the previously examined sub-schedules for list 4 can enable partial schedule 4 to meet its requirements, then the partial schedule is pruned back one step (see FIG. 3E), and the "next best" sub-schedule for list 3 is selected. Specifically, new partial schedule 3' becomes 1a 2a 3b. Re-growth of the partial schedule back to partial schedule 4' is then attempted (see FIG. 3F), where the previously examined list 4 either remains the same or may be modified, as discussed above. Even if the groups in list 4 are not changed, the candidate sub-schedules and their ranking will change, because a new "origin" state for the sub-schedules has been selected.

The process of growing and pruning continues until all of the groups have been included in the schedule, or until some other terminating condition is encountered. For example, in a given embodiment the process may be halted when the total execution time of the schedule exceeds a defined maximum.

It should be noted that in some implementations it may be necessary to execute the partial schedules "on the fly." In other words, execution of the schedule may begin before the schedule determining process has been completed. The present approach of incrementally growing a partial schedule is readily adapted to this scenario, with the primary impact being that pruning will be limited to only those sub-schedules that have not yet been executed. This limitation of pruning options may increase the possibility that the grow and prune process may not be able to generate a schedule that includes all of the pointing targets. Instead, a "least bad" sub-schedule that omits at least one group may need to be "locked" into the partial schedules as the grow and prune process continues.

One of the advantages of the present method is that the groups and the group schedules remain invariant once they are initially established, thereby significantly reducing the schedule calculation time. Also, it is notable that the group schedules are determined independently of each other, and can therefore be determined in parallel, which may further reduce the computation time in a multi-processor system due to parallel processing.

It should also be noted that while the requirements that apply to the various partial schedules will generally ensure that the resulting schedule will be "acceptable," they do not guarantee, in embodiments, that the resulting schedule will be truly "optimal," i.e. substantially equal in "score" to a result that would be obtained by an exact consideration of the target queue as a whole.

In embodiments, if a target queue is to be repeated, but with some changes to the targets, the process as described above is simply repeated for the modified target queue.

A first general aspect of the present disclosure is a method of directing a pointing device according to a pointing schedule. The method includes partitioning a plurality of targets among a plurality of groups, each of the groups including at least one of the targets, at least one of the groups including a plurality of the targets; assigning a group schedule to each of the groups, said group schedule defining a series of pointing transitions between the targets included in the group, the group schedule thereby defining an order in which the targets of the group are to be included in the pointing schedule; defining an initial partial schedule by designating an initial pointing direction of the pointing device as partial schedule (0), the initial pointing direction being also designated as terminal state (0), where (0) indicates that an index (n) is equal to zero.

The method further includes growing the partial schedule by:
A) incrementing index n (n=n+1);
B) generating a list (n) of groups that are not included in the partial schedule;
C) identifying at least one candidate sub-schedule for list (n), each of the candidate sub-schedules beginning at terminal state (n−1) and including at least one of the groups in list (n), each of the candidate sub-schedules that includes more than one group defining a series of pointing transitions between the groups included in the sub-schedule;
D) selecting from at least one candidate sub-schedule for list (n) a first sub-schedule (n) having terminal state (n);
E) appending first sub-schedule (n) to partial schedule (n−1), thereby growing the partial schedule to become partial schedule (n) having terminal state (n);
F) if partial schedule (n) meets all applicable predetermined requirements, and if no predetermined terminating criterion is satisfied, repeating steps A) through E);
G) if partial schedule (n) fails to meet an applicable requirement, removing first sub-schedule (n) from the partial schedule and, if possible, replacing it with a second sub-schedule (n) that was not previously selected from among the candidate sub-schedules for list n, second sub-schedule (n) including at least one of the groups in list (n) and having a second terminal state (n), thereby updating partial schedule (n);
H) if updated partial schedule (n) meets all of the applicable requirements, and if no terminating criterion is satisfied, then repeating steps A) through G), otherwise, if possible, repeating step G);
I) if repeating step G) cannot provide an updated partial schedule (n) that meets all of the applicable requirements, pruning the partial schedule by:
  a) decrementing index n (n=n−1), thereby reverting the partial schedule to its previous status;
  b) replacing first sub-schedule (n) of the previous partial schedule with a second sub-schedule (n) that was not previously selected from among the candidate sub-schedules for list (n); and
  c) repeating steps A) through H); and
J) repeating steps A) through I) until n reaches a final value N for which at least one terminating criterion is satisfied, partial sub-schedule (N) thereby being a full pointing schedule.

The method further includes causing the pointing device to execute the full pointing schedule;

In embodiments, distributing the targets into a plurality of groups includes distributing the targets into the groups at least in part according to relative linear or angular separations between the targets.

In any of the above embodiments, a corresponding value can apply to each of the targets; for each of the groups, a value of the group can be equal to a sum of the values of the targets that are included in the group; and for each of the sub-schedules, a value of the sub-schedule can be equal to a sum of the values of the groups included in the sub-schedule. In some of these embodiments, distributing the targets into the plurality of groups includes distributing the targets into the groups at least in part according to their values. In any of these embodiments, in step D) the first sub-schedule (n) can be selected according to the value of the sub-schedule.

In any of the above embodiments, a corresponding dwell time can apply to each of the targets; a corresponding slew time can apply to each possible pointing transition between two of the targets; for each of the groups, a dwell time of the group can equal to a sum of the dwell times of the targets in the group plus a sum of the slew times of the pointing transitions included in the group schedule of the group; for each possible pointing transition between a first of the groups and a second of the groups, a corresponding slew time can be equal to the slew time from the ending target of the group schedule of the first group to the beginning target of the group schedule of the second group; for each of the sub-schedules, a dwell time of the sub-schedule can be equal to a sum of the dwell times of the groups included in the sub-schedule and a sum of the slew times of the pointing transitions between the groups included in the sub-schedule; and for each value of (n), a dwell time of partial schedule (n) can be equal to a sum of the dwell times of the sub-schedules included in partial schedule (n). In some of these embodiments, in step D) first sub-schedule (n) is selected according to the dwell time of the sub-schedule. In any of these embodiments, in in steps F), H), and J), one of the terminating criteria can be that the dwell time of partial schedule (n) equals or exceeds a specified maximum schedule dwell time.

In any of the above embodiments, a corresponding window of performance can apply to each of the targets, such that pointing of the pointing device at the target is only possible during its window of performance; and a corresponding window of performance can apply to each of the groups, wherein the pointing device must point at the beginning target of the group schedule of the group during the window of performance of the group so as to enable the pointing device, when executing the group schedule of the group, to point at each of the targets of the group during the target's window of performance. In some of these embodiments, the targets are distributed into the plurality of groups at least in part according to their windows of performance; the group schedules are assigned to the groups at least in part due to the windows of performance of the targets in the groups; in step B) the list (n) of groups is generated at least in part due to the windows of performance of the groups; and/or in step C) the groups are included in the candidate sub-schedules at least in part due to the windows of performance of the groups. In some of these embodiments, in step D) selecting first sub-schedule (n) includes rejecting all candidate sub-schedules that do not direct the pointing device at each of the groups of the candidate sub-schedule within the window of performance of that group. In any of these embodiments, one of the applicable requirements in steps F) and H) can require that for each of the groups in the partial schedule, pointing at the group is scheduled to begin within the window of performance of the group, and none of the groups that are not included in the partial schedule is a "missed" group having a window of performance that does not extend beyond a hypothetical ending time of the partial schedule. And in some of these embodiments, if a group is missed by all partial schedules that can be identified in step C) within a specified calculation time, the group is excluded from the plurality of groups and from the applicable criteria, and is not included in the full pointing schedule.

In any of the above embodiments, in steps F), H), and J), one of the terminating criteria can be that all of the groups are included in the partial schedule, such that the partial schedule is a complete pointing schedule.

In any of the above embodiments, the group schedules can be assigned to the groups according to a strategy that is one of exact, random, repeat split, relative pare, and absolute pare.

In any of the above embodiments, in step C) the candidate sub-schedules can be identified according to a strategy that is one of exact, random, repeat split, relative pare, and absolute pare.

In any of the above embodiments, executing the full pointing schedule can cause the pointing device not to point at all of the groups in the plurality of groups.

In any of the above embodiments, if steps I) b) and I) c) cannot provide an updated partial schedule (n) that meets all of the applicable requirements, the partial schedule can be further pruned by repeating step I a).

In any of the above embodiments, causing the pointing device to execute the full pointing schedule can include causing the pointing device to begin executing one of the partial schedules before n has reached its final value N in step J).

A second general aspect of the present disclosure is a missile defense system comprising a computing device configured to execute instructions that cause the computing device to determine a pointing schedule by executing the method of claim 1, the computing device being further configured to cause the missile defense system to execute the determined pointing schedule.

A third general aspect of the present disclosure is a communications system comprising a computing device configured to execute instructions that cause the computing device to determine a pointing schedule by executing the method of claim 1, the computing device being further configured to cause the communications system to execute the determined pointing schedule.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1B illustrates assigning a group schedule to a group according to windows of performance of the targets in the group according to an embodiment of the present disclosure;

FIG. 1C illustrates linking of groups to create a pointing schedule or sub-schedule according to an embodiment of the present disclosure;

FIG. 3A illustrates a first step of growth of a partial schedule according to an embodiment of the present disclosure;

FIG. 3B illustrates a second step of growth of the partial schedule of FIG. 3A according to an embodiment of the present disclosure;

FIG. 3C illustrates a third step of growth of the partial schedule of FIG. 3B according to an embodiment of the present disclosure;

FIG. 3D illustrates replacing the best sub-schedule selected in FIG. 3C with a next best sub-schedule according to an embodiment of the present disclosure;

FIG. 3E illustrates pruning the partial schedule of FIG. 3D by reverting the partial schedule to the partial schedule of FIG. 3B according to an embodiment of the present disclosure;

FIG. 3F illustrates re-growing of the pruned partial schedule of FIG. 3E according to an embodiment of the present disclosure;

DETAILED DESCRIPTION

The present disclosure is a method executable by a pointing device scheduler that is able to produce acceptable pointing schedules for a target queue within acceptable computation times according to the relative directions of the targets, their dwell times, their relative weights, and their windows of performance, as well as any other time constraints that may apply.

Figure 1A:
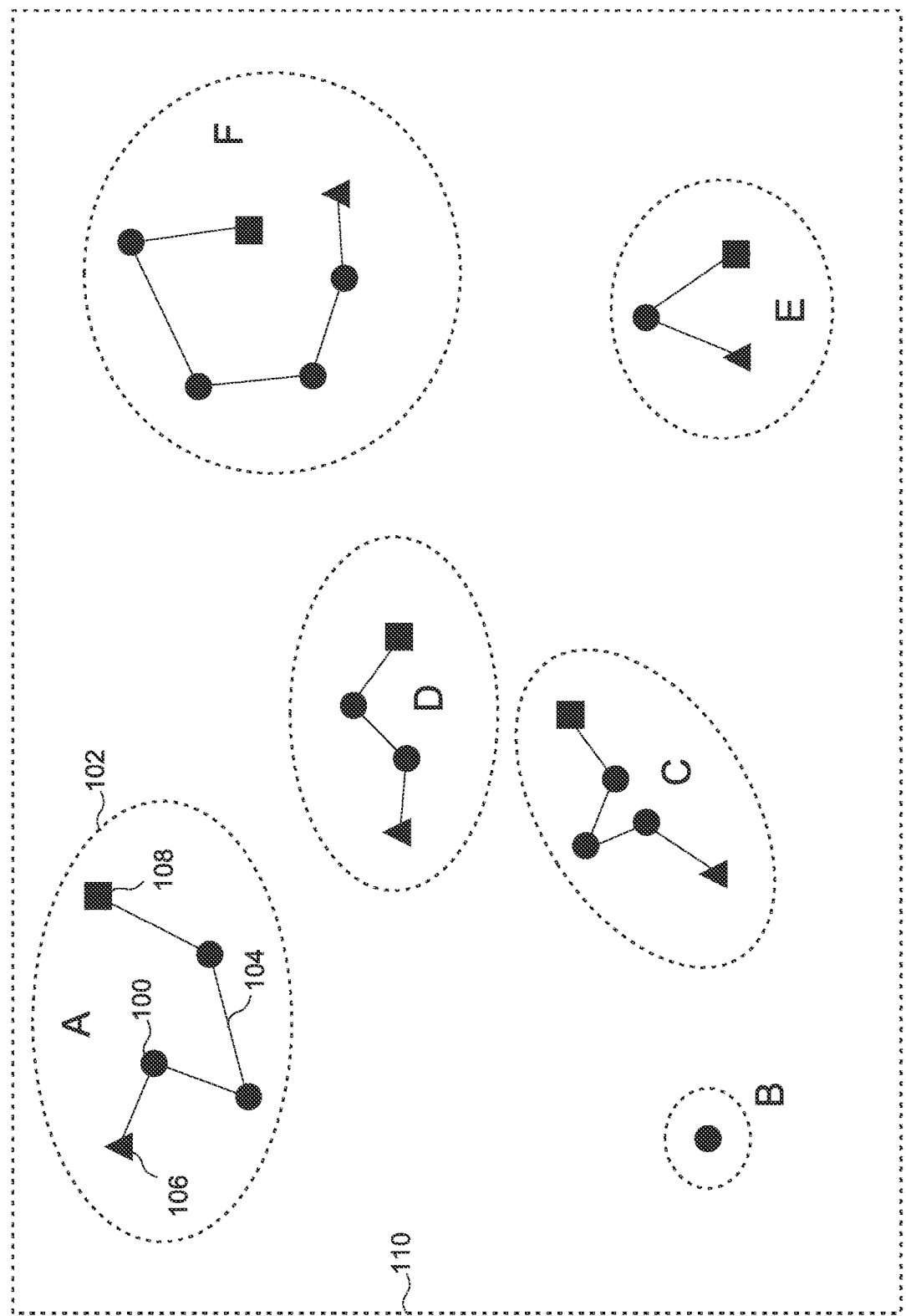
FIG. 1A illustrates distribution of targets into groups and assigning of group schedules to the groups according to an embodiment of the present disclosure.

With reference to FIG. 1A, the pointing device scheduler partitions the targets of a target queue into a plurality of groups. FIG. 1A illustrates an example illustrated in "pointing space" that is applicable to an astronomical telescope schedule, where the targets 100 are represented as "dots" indicating the directional locations of the targets. According to the present disclosure, the pointing device scheduler divides the target queue 110 into a plurality of groups 102. In the illustrated embodiment, the groups 102 are selected according to the angular "distances" between the targets 100. It can be seen that each of the groups A, C, D, E, and F includes a plurality of targets 100 that are close to each other in angular distance, so that the slew times within each group 102 will be minimized. Group B includes only one target 100.

In the embodiment of FIG. 1A, the targets are partitioned into groups according to their angular separations. With reference to FIG. 1B, in other embodiments targets 100 that have overlapping or closely adjacent windows of performance are included in the same group. In FIG. 1B, the vertical axis represents the angular or linear "locations" of the targets, while the horizontal axis represents time. The targets 100 are indicated in FIG. 1B as horizontal lines that represent their windows of performance. The targets 100 are partitioned into groups 102 in FIG. 1B according both to their locations and their windows of performance. In the illustrated example, targets T1-T4 are included in the same group 102, because they are close together in distance and have proximal windows of performance. In contrast, targets T5, T6, and T7 are assigned to groups B, C, and D respectively, where each of these groups includes only one target. While targets T5 and T7 are close to each other in location and window of performance, they are not included in a common group because the window of performance for T6 falls between them, and because including T5 and T7 within the same group would preclude a schedule that pointed successively at T5, T6, and T7.

It will be noted that the gaps between the paths 104 in FIG. 1B indicate the dwell times of the targets 100. Also, it will be noted that all of the paths 104 have approximately the same (absolute) slope, indicating that the transitions between targets 100 take place at constant slew rates. For example, a telescope would typically be reoriented from one target to the next at a constant rate, such that the slew times between targets would be proportional to the angular separations of the targets.

In still other embodiments, the targets 100 that are selected for each group 102 have similar weights or values. For example, if the target values range from 1-100, then a first group 102 could include all targets having weights between 90 and 100, a second group 102 could be all targets having weights between 80 and 90, and so forth. Embodiments combine a plurality of these approaches, for example by partitioning the targets 100 into larger intermediate sets according to their windows of performance, and then partitioning the intermediate sets selecting smaller groups 102 according to their angular and/or spatial positions and value ranges.

It should be noted that if all of the targets 100 in a target queue are considered to have the same value, then they can all be considered to have a weight of 1. It should also be noted that if it is desirable to repeatedly point at a target T in a target queue, where a separate window of performance applies to each of the desired pointing events, then for scheduling purposes the target 100 is treated as if it were a plurality of targets 100. In other words, target T becomes targets T1, T2, T3, etc, where the numerals indicate the windows of performance that are applicable to each instance of pointing at target T. In general, the targets T1, T2, etc. can be assigned to the same or to different groups 102 according to their windows of performance, or according to other criteria. For example, in the example of FIG. 1B, T1 and T6 represent two different instances of pointing at the same target.

With reference to FIGS. 1B and 1C, once the pointing targets 100 have been partitioned into groups 102, the groups 102 are separately examined and a "group schedule" 104 is determined for each of the groups 102 that includes more than one target 100. In each case, the group schedule 104 begins at a group beginning target 106 and ends at a group ending target 108. In the example of FIG. 1B, group B includes only one pointing target 100, such that Group B does not require selection of a starting point, ending point, or group schedule.

Figure 2A:
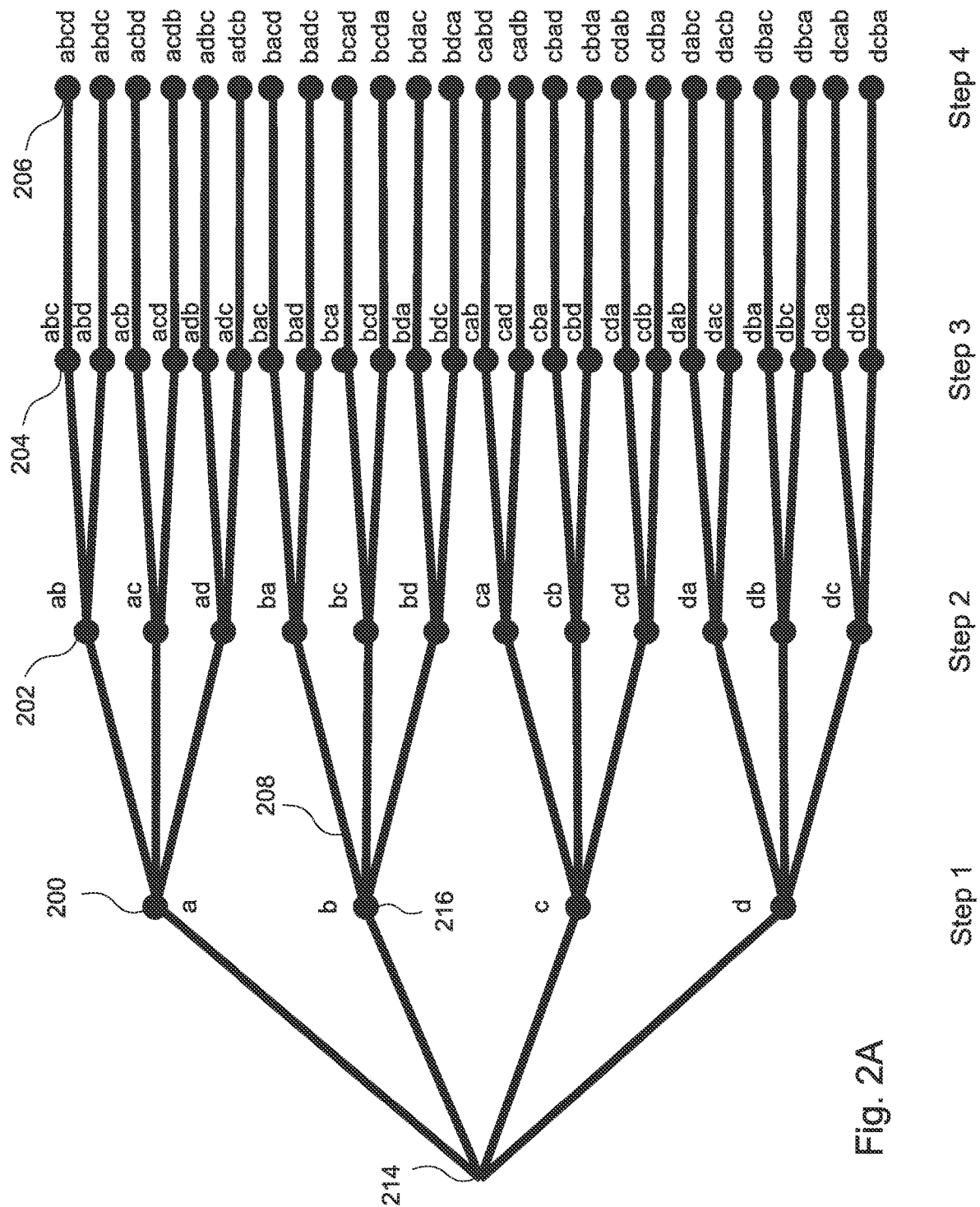
FIG. 2A is a state diagram that illustrates all possible group schedules for a hypothetical group of four targets.

Different strategies are implemented in various embodiments to determine the group schedule 104 for each group 102. With reference to FIG. 2A, if a group 102 includes only a small number of targets 100, then an "exact" analysis can be applied to determine the most efficient schedule for the group.

FIG. 2A illustrates all of the possible group schedules that could be applied to a group 102 containing 4 targets 100. The group schedules are illustrated in "state space," where each "dot" 216 represents a hypothetical "state" of the pointing schedule, and the lines 208 that interconnect the dots 216 represent transitions made from one state to another.

At the first step of the process, each of the four pointing directions that are included in the group represent a possible starting target 106 for the group schedule. These four possible choices are indicated in the drawing as four transitions or "paths" 208 from a hypothetical initial or "zeroth" state 214 to each of the first four states 200, which are labeled as a-d. These first paths 208 can also be interpreted as the beginnings of branches that will be further split in the subsequent steps 202, 204, 206.

In the second step 202, three possible paths 208 are available from each of the end states 216 of the first paths 208, because each of the states 216 in step 1 corresponds with having pointed at only one target 100, with three pointing targets still remaining. Accordingly, in the second step 202 each of the four initial branches is split into three branches. For example, the topmost path 208 in step 1 of FIG. 2A, which terminates at a state that only includes target a, is split in step two 202 into three branches indicated as ab, ac, and ad. In step 3, each of the branches is further split into two more paths. For example, path ab is further split into abc and abd. In step four, the branches are no longer split, because in each case there is only one remaining target 100 to be pointed at in the group 102. Note that in this state representation, the order of letters in these labels is important for describing that state. The exact ordering of pointing at targets has direct impacts on subsequent slew times and thus satisfaction of windows of performance and path 208 ranking.

It will be noted that each of the "dots" 206 at the far right of FIG. 2A represents a potential or "candidate" group schedule for the illustrated group 102. However, FIG. 2A does not depict the slew times of the indicated paths 208, but merely illustrates the available candidate group schedules. Identification and ranking of these available group schedules requires that each of their total execution times must be calculated and compared. Because all of the pointing targets in the group will be included in each of the possible group schedules, it will typically be differences in the execution times that will determine the relative "scores" that are assigned to each of the possible group schedules. Note that the "possible" group schedules include only those group schedules that satisfy the performance windows of all pointing targets in the group.

FIGS. 2B through 2F illustrate various strategies that can be followed for examining the available options while selecting and ranking possible schedules for a group. In FIGS. 2B through 2F, the horizontal offsets of the states 216 in each step are indicative of differences in the cumulative efficiency (inversely corresponding to aggregate slew times) of the states 216. FIGS. 2B through 2F also include ranking tables 218 that indicate the rankings of the candidate group schedules that were examined. In the illustrated embodiment of FIGS. 2A through 2F, the depicted state diagrams represent the identification and ranking of group schedules 104 for an example group 102 containing four targets 100, but should be understood to support any number of targets 100 greater than one, following the corresponding descriptions.

Figure 2B:
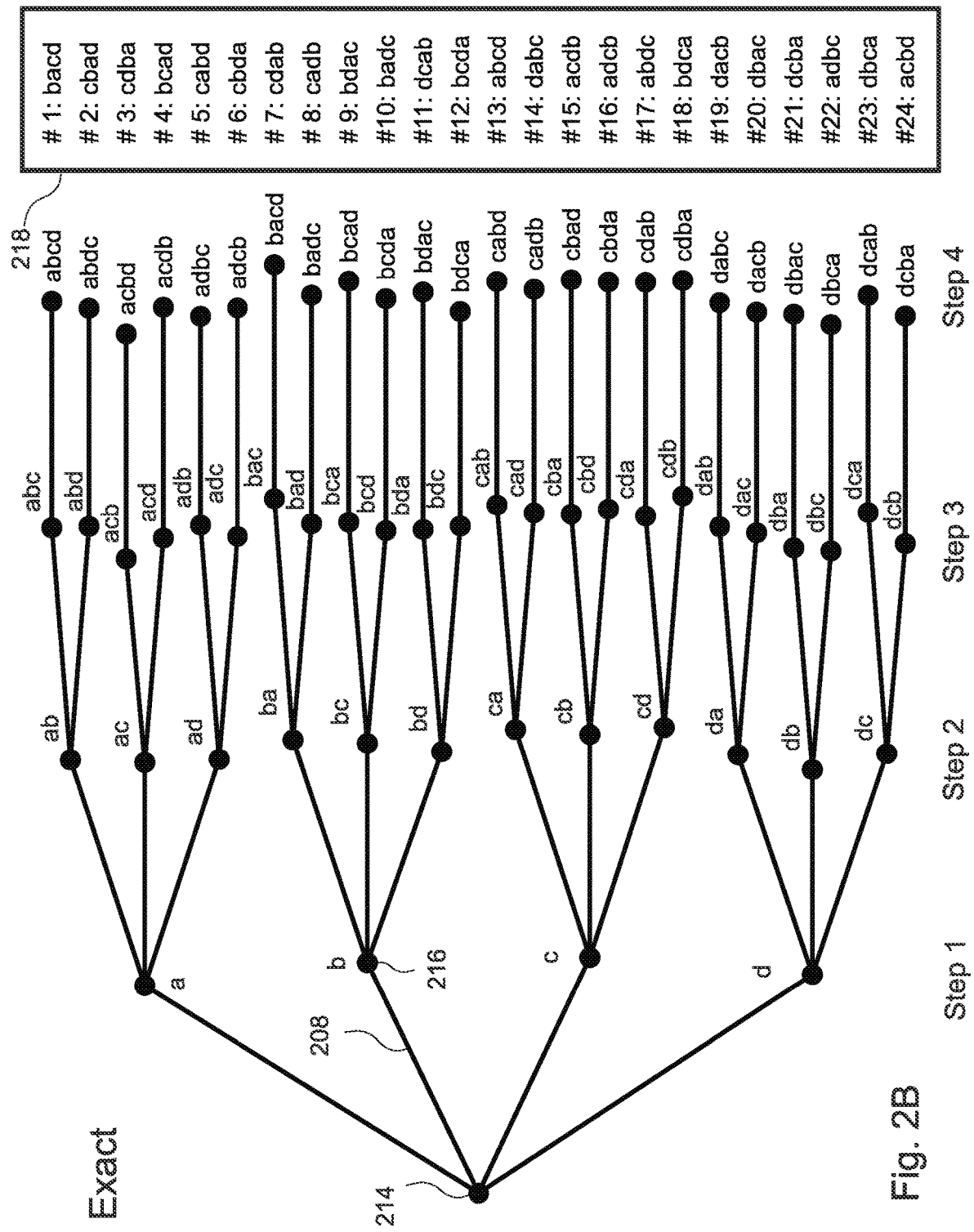
FIG. 2B is a state diagram that illustrates an exact approach to evaluating and scoring group schedules according to an embodiment of the present disclosure.

According to an exact approach, as is illustrated by FIG. 2B, all of the candidate group schedules of FIG. 2A are compared with each other and ranked 218 to determine the "best" schedule for the group 102. In some embodiments, the "best" group schedule will be the one with the shortest aggregate slew time, because all of the possible group schedules are required to include all of the targets, and therefore they will have identical total weights. In other embodiments, the best candidate group schedule will be the one that points to the targets 100 most nearly according to their windows of performance, for example beginning with the target that has the "earliest" window of performance and ending at the target having the "latest" window of performance.

It is notable that some of the candidate group schedules 208 illustrated in step 4 206 may not be possible, for example if they fail to satisfy the windows of performance that apply to the targets 100 a, b, c, and d. For example, if target b has a window of performance that does not begin until after the window of performance of target a has closed, then it is clear that the group schedule must point to a first and then to b. Any candidate schedule that places b before a will therefore be rejected from consideration, even if the total slew time for that candidate schedule is very short.

In FIGS. 2A through 2F, the group 102 includes four targets 100, resulting in a total of 24 candidate group schedules, which equals 4*3*2*1. In general, the number of candidate group schedules for a group of N targets will be N factorial. For larger groups, the exact approach of FIG. 2B rapidly becomes impractical, and so other strategies must be implemented. With reference to FIGS. 2C through 2F, examples of these other strategies include a random approach (FIG. 2C), a "repeat split" approach (FIG. 2D), a "relative pare" approach (FIG. 2E) and an "absolute pare" approach (FIG. 2F), which are described in more detail in the following discussion. In general, these approaches aim to examine a smaller, more tractable portion of the possible candidate schedules while still finding as many high-ranking solutions as possible. Because these approaches examine and rank a subset of the possible candidate schedules, they cannot know with certainty the candidates' absolute ranking, as is shown in FIG. 2B 218. As such, these inexact approaches are generally constructed with different schemes that offer different trade-offs between algorithmic complexity and a bias towards high-ranking results.

Figure 2C:
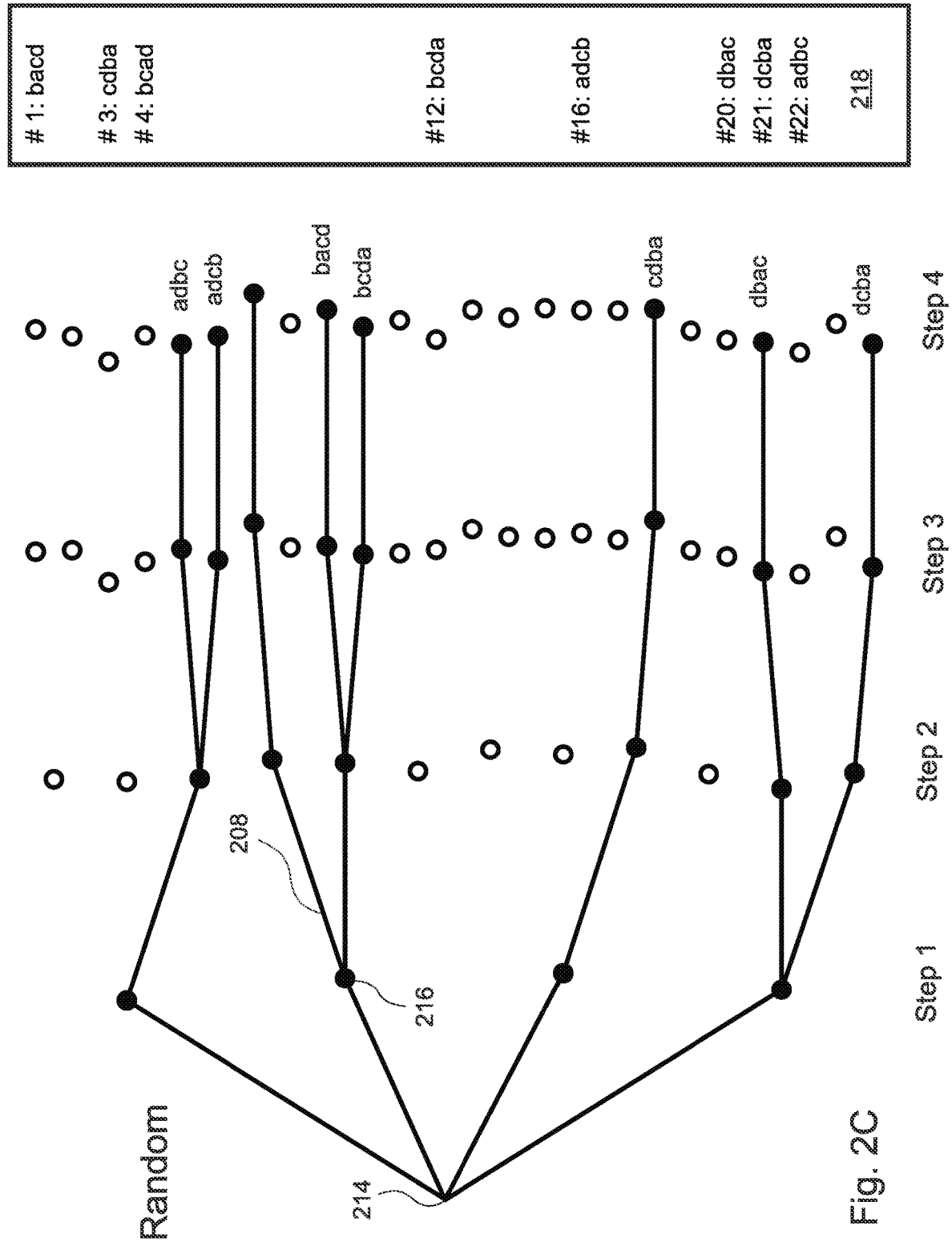
FIG. 2C is a state diagram that illustrates a random approach to evaluating and scoring group schedules according to an embodiment of the present disclosure.

With reference to FIG. 2C, according to the "random" approach, all of the possible group schedules are enumerated. However, in contrast to the exact approach of FIG. 2B, only a random subset of the branches are selected and compared. In FIG. 2C, nine branches are randomly selected from the total of 24. This approach can be thought of as selecting a subset of the states or "dots" 206 at the right of FIG. 2B, each of which defines a unique candidate group schedule. The randomly selected branches are then compared with each other, and the "best" branch from among the subset is selected as the group schedule 104.

Figure 2D:
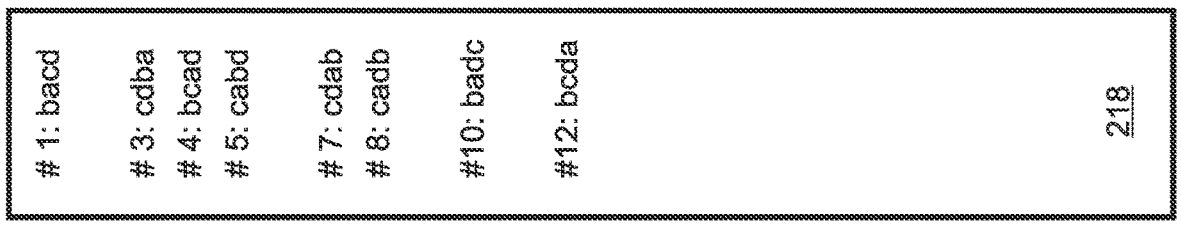
FIG. 2D is a state diagram that illustrates a repeat split approach to evaluating and scoring group schedules according to an embodiment of the present disclosure.
Figure 2D:
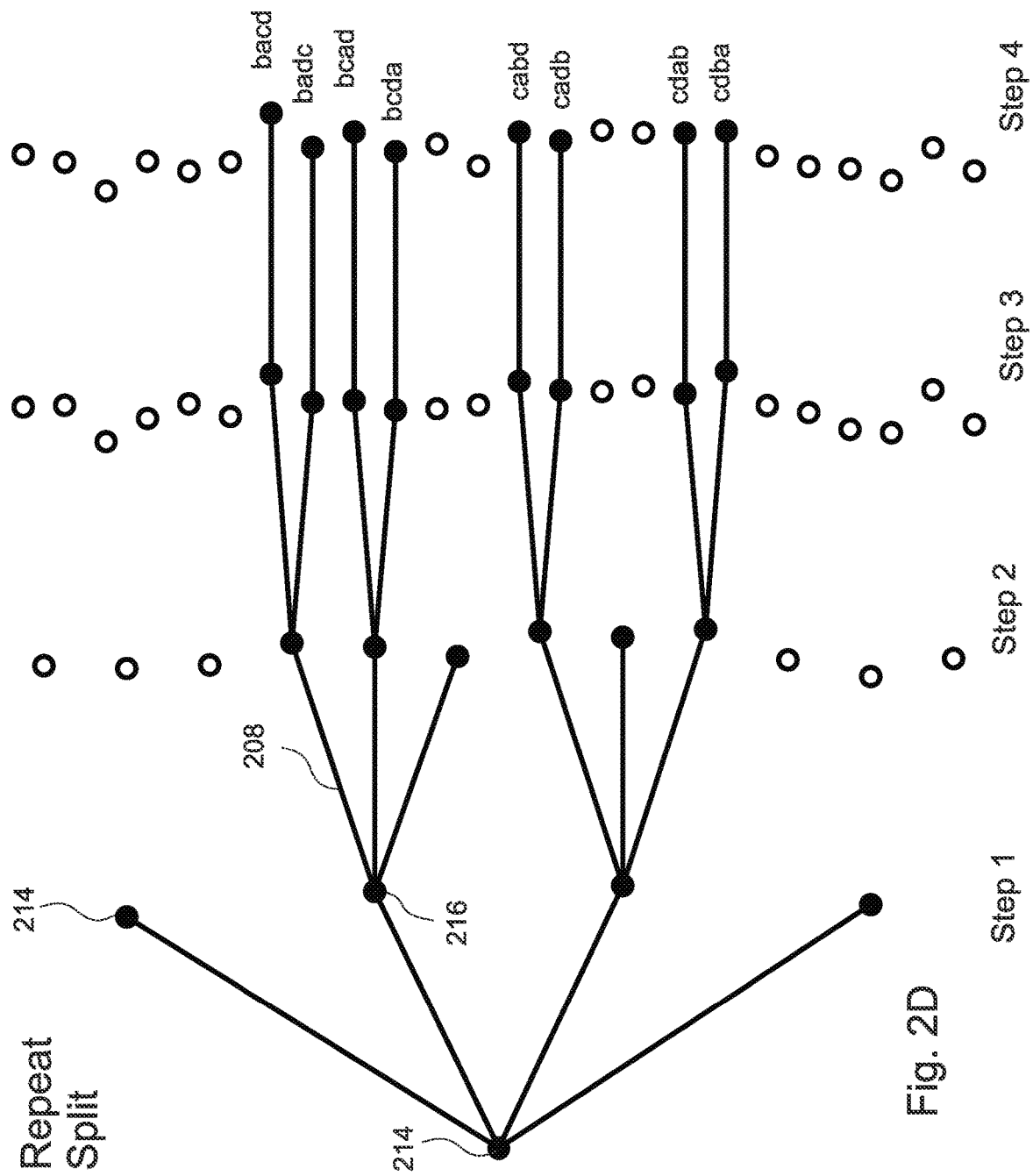

With reference to FIG. 2D, according to the "repeat split" approach, the splitting of the branches 208 at each step is limited to a maximum number. In the example of FIG. 2D, the splitting process is limited to a maximum of 2 paths 208 for each branch at each step, such that at each step, each of the branches can be split, at most, into two branches. In embodiments, when more than the specified maximum number of paths 208 are available to a given branch at a given step, the branches 208 up to the step under evaluation can be compared to each other as a guide to selecting the specified number of paths for the current step.

It can be seen in the example of FIG. 2D that at step 1, only two of the four available paths 208 are selected, and for each of the paths selected at step 1, only two of the available paths 208 are selected in step 2. At step 3, there are only two paths 208 extending from each of the branches of step 2, such that no further down-selection is required. The number of candidate group schedules that must be examined according to this approach is $n^{N-1}$, i.e. n raised to the (N−1) power, where n is the specified maximum number of paths 208 at each step. In the illustrated example, n=2 and N−1=3, such that the total number of branches 208 that are examined is 2 cubed, i.e. 8.

Figure 2E:
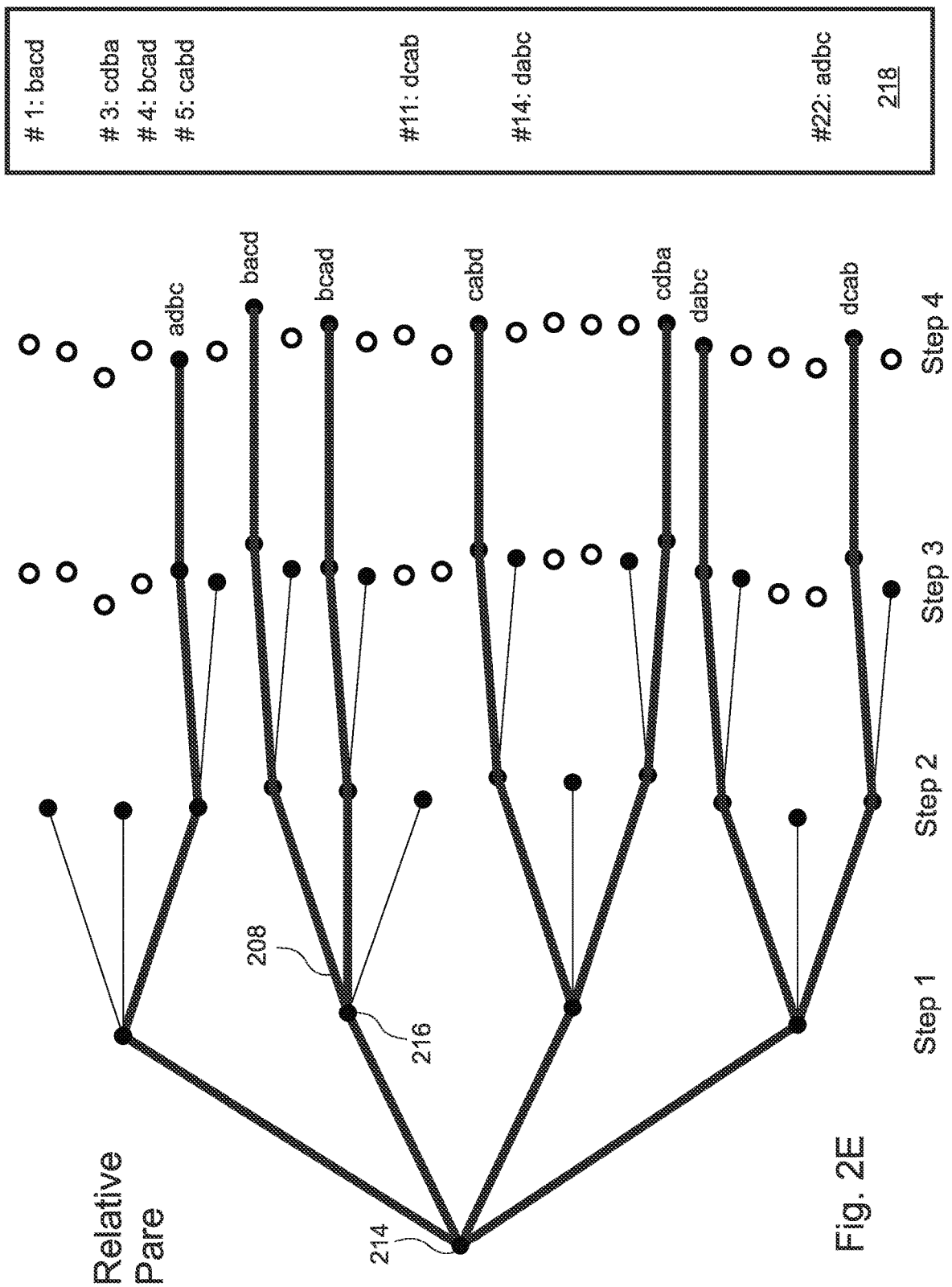
FIG. 2E is a state diagram that illustrates a relative pare approach to evaluating and scoring group schedules according to an embodiment of the present disclosure.

According to the relative pare approach of FIG. 2E, a limit M is set as to the number of branches that will be maintained at each step. In the illustrated example, M is two. Accordingly, the locally best two of the available four paths 208 are selected in step 1, and in each subsequent step only the locally best path 208 is selected for each branch, so that the number of branches that are being examined remains at two. If M is greater than the number of branches at the first step, then the branches are further split in subsequent steps until M branches are being maintained. Of course, this approach has the advantage that only M candidate group schedules need to be fully examined.

Figure 2F:
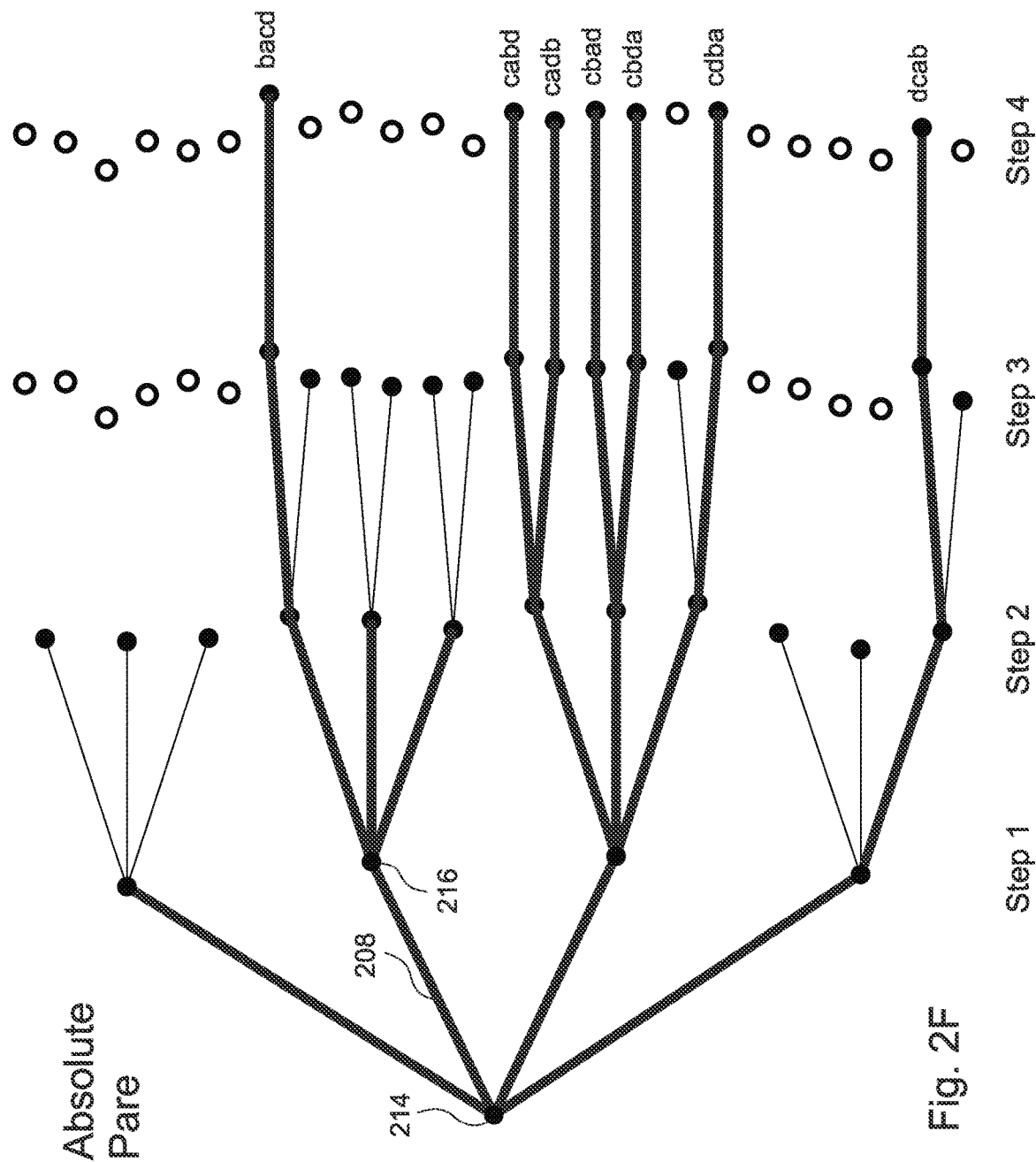
FIG. 2F is a state diagram that illustrates an absolute pare approach to evaluating and scoring group schedules according to an embodiment of the present disclosure.

The "Absolute Pare" approach of FIG. 2F is similar to the relative pare approach of FIG. 2E, in that the number of branches under evaluation at any given step is not allowed to exceed a maximum number M. However, unlike the Relative Pare approach of FIG. 2E, in the Absolute Pare approach all of the possible branches 208 are examined at each step. Rather than necessarily maintaining all of the selected branches in each subsequent step, as is required by the relative Pare approach, the Absolute Pare approach allows some previously selected branches to be terminated, so that the splitting of other previously selected branches can be increased without exceeding M total branches under evaluation. This approach also has the advantage that only M candidate group schedules need to be compared.

Once the group schedules have been assigned, an effective dwell time for each of the groups 102 is defined as the total of the slew times and dwell times of the group schedule 104, and an effective "weight" of each group 102 is defined as the total of the weights of all of the targets 100 in the group 102. An effective window of performance for each group is defined as beginning at the start of the window of performance for the beginning target 106 in the group, and ending at the end of the window of performance for the beginning target 106, or earlier if necessary to accommodate the windows of performance of the other targets 100 in the group 102.

The slew time between a pair of groups is defined as the slew time between the ending target 108 of one of the groups 102 (the "source" group) and the beginning target 106 of the other of the groups 102 (the "destination" group). It is notable that the slew time from group A to group B will, in general, be different from the slew time from group B to group A.

It is notable that once the groups 102 have been defined and the group schedules have been determined, the groups 102 and their associated group schedules remain unchanged throughout the remainder of the scheduling process. With reference again to FIG. 1C, creation of a schedule 112 for the entire target queue thereby only requires determining which of the groups 102 will be included in the schedule, and the order in which the included group schedules 102 will be executed in the schedule 112. This is accomplished according to a "grow" and "prune" approach, as follows.

With reference to FIGS. 3A through 3G, The initial pointing state 308 of the pointing device is defined to be the "zero'th" sub-schedule and partial schedule, and one or more of the groups 102 are selected as a first "list" 312 of groups 102 to be examined. If the first list 312 includes more than one group 102, then possible first list sub-schedules are examined that interconnect at least some, but not necessarily all, of the groups 102 in the list. The "best" of these sub-schedules 314 is then designated as a first partial schedule 300 that begins with a source group and terminates in a destination group of the first partial schedule 300. An execution time and cumulative weight can then be determined for the first partial schedule 300, in the same manner as described above for determining the effective dwell time and effective weight of an individual group 102.

It will be noted that in FIGS. 3A through 3F, paths 208 that were examined when analyzing and comparing the possible sub-schedules are indicated with thick lines, while other possible paths 208 that were not fully examined are indicated with thin lines. The thick lines that extend all the way to the terminal states of the sub-schedules indicate the candidate sub-schedules that were examined and ranked 218. The terminal state of the "best" of the ranked sub-schedules is indicated in the figures as element 310.

The candidate sub-schedules for a list 312 can be ranked according to the effective weights of the candidate sub-schedules, the execution times of the candidate sub-schedules, ratios of their effective weights over their execution times, or any combination of these and/or other criteria. Of course, candidate sub-schedules that do not satisfy all of the windows of performance for all of the groups 102 in the sub-schedule will be rejected from consideration.

According to the grow and prune approach, the "best" sub-schedule will be used in a first attempt to grow the partial schedule. If this approach fails, as discussed below, then next most highly ranked candidate sub-schedule will be used in a first attempt to grow the partial schedule, and so forth.

Once the first partial schedule 300 is determined, a new list 312 is chosen that consists of one or more of the groups 102 that have not yet been included in the partial schedule. With reference to FIG. 3B, possible sub-schedules 302 that connect the terminal state 310 of the first partial schedule 300 with at least some of the groups 102 in the new list 312 are then examined and ranked, and the "best," i.e. the most highly ranked, of these sub-schedules 302 is appended to the first partial schedule 300 to create a second partial schedule that extends or "grows" the first partial schedule 300 and ends in a terminal state 310 of the grown partial schedule. This process is continued, as shown in FIG. 3C, so long as each grown partial schedule meets all of its applicable requirements.

In each step of this growth process, all of the groups 102 in the pending list 312 may be included in the sub-schedules 314, or only a subset of the groups 102 in the list 312 may be included in the sub-schedules 314. In the example of FIGS. 3A through 3F, the number of groups 102 to be included in each sub-schedule 314 is specified to be three groups 102, which is indicated in the state diagrams of FIGS. 3A through 3F as each candidate sub-schedule 314 having exactly three steps between its initial and terminal states. If the current list 312 includes seven groups, then the "best" sub-schedule selecting three of the groups 102 in the list 312 will be added to the partial schedule. However, if the pending list includes three or fewer groups 102, then all of them will be added to the partial schedule.

In other embodiments, the number of groups 102 that are included in updated lists 312 and in each sub-schedule 314 are determined according to a specified time increment and the windows of performance of the groups 102. For example, if a partial schedule has an execution time of one hour, and a time increment of 10 minutes is specified, then a list 312 may be updated to include all groups 102 having windows of performance that overlap the period between one hour and one hour plus 10 minutes. Similarly, the sub-schedules 314 for that list 312 can be limited to those sub-schedules 314 having execution times that do not exceed 10 minutes.

Various requirements can be applicable to the partial schedules that result from the growth steps. For example, it may be required that no group 102 is "missed," i.e. that none of the groups 102 that are not yet included in the partial schedule has a window of performance that lies entirely within the execution time of the partial schedule. Another possible requirement is that the execution time of the partial schedule should not exceed a specified maximum. Yet another possible requirement is that a partial schedule must have a "score" that is above a specified minimum, where the score is determined according to both the effective weight of the partial schedule and the execution time of the partial schedule. For example, the score for a partial schedule might be expressed as a ratio of its effective weight to its execution time, expressed as a fraction in units of inverse minutes.

With reference to FIG. 3D, if a partial schedule 300+302+304 fails to meet its applicable requirements when the "best" sub-schedule of the pending list is appended thereto, then the other sub-schedules that were previously examined for the current list are tested in the order of their ranking to see if any of them can provide a growth step that meets all applicable requirements. FIG. 3D illustrates the testing of the next best of the examined sub-schedules, as indicated by shifting the end state 310 to the next best end state.

With reference to FIG. 3E, if none of the previously examined sub-schedules of the current list 312 can provide a growth step that meets all requirements, the partial schedule 300+302+304 is "pruned," in that the most recently considered sub-schedule 304, indicated in FIG. 3E with dashed lines, is removed from the partial schedule, thereby reverting the partial schedule to its previous status 300+302 before the most recent growth step. If each successive partial schedule is numbered, and the lists are correspondingly numbered, then pruning reverts partial schedule "n" back to partial schedule "n−1."

It will be noted that, in general, a plurality of candidate sub-schedules for list n−1 will have already been examined and ranked as best, second best, etc. These "previously examined" but not previously selected sub-schedules are indicated by the thin lines in FIG. 3B. Accordingly, it is not generally necessary after pruning to examine additional sub-schedules for list n−1. Instead, with reference to FIG. 3F, the "next best" 302' of the sub-schedules that were previously examined for list n−1 is selected, as indicated by new final state 316, and the partial schedule is re-grown from n−1 back to a new partial schedule n' by repeating the growth process "from scratch," i.e. by re-selecting a list, examining a plurality of sub-schedules for the list, and appending the best of the candidate sub-schedules 306 to the previous partial schedule. A determination is then made as to whether the new partial schedule 300+302+306 satisfies its applicable requirements. If none of the previously examined sub-schedules for list n−1 enables partial schedule n to meet its requirements, then the partial schedule is further pruned to "n−2" 300, and the process is continued.

Figure 3G:
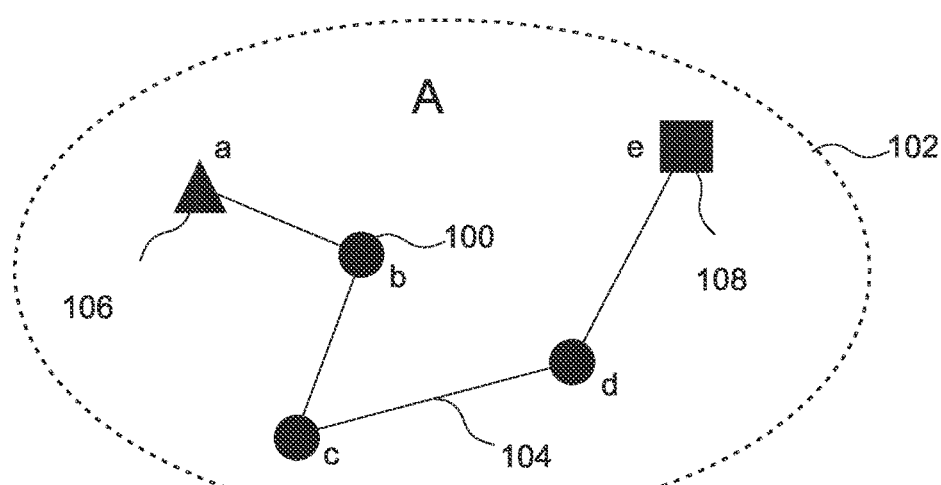
FIG. 3G illustrates including all of the targets of a group in the group schedule that is assigned to the group, according to an embodiment of the present disclosure.
Figure 3H:
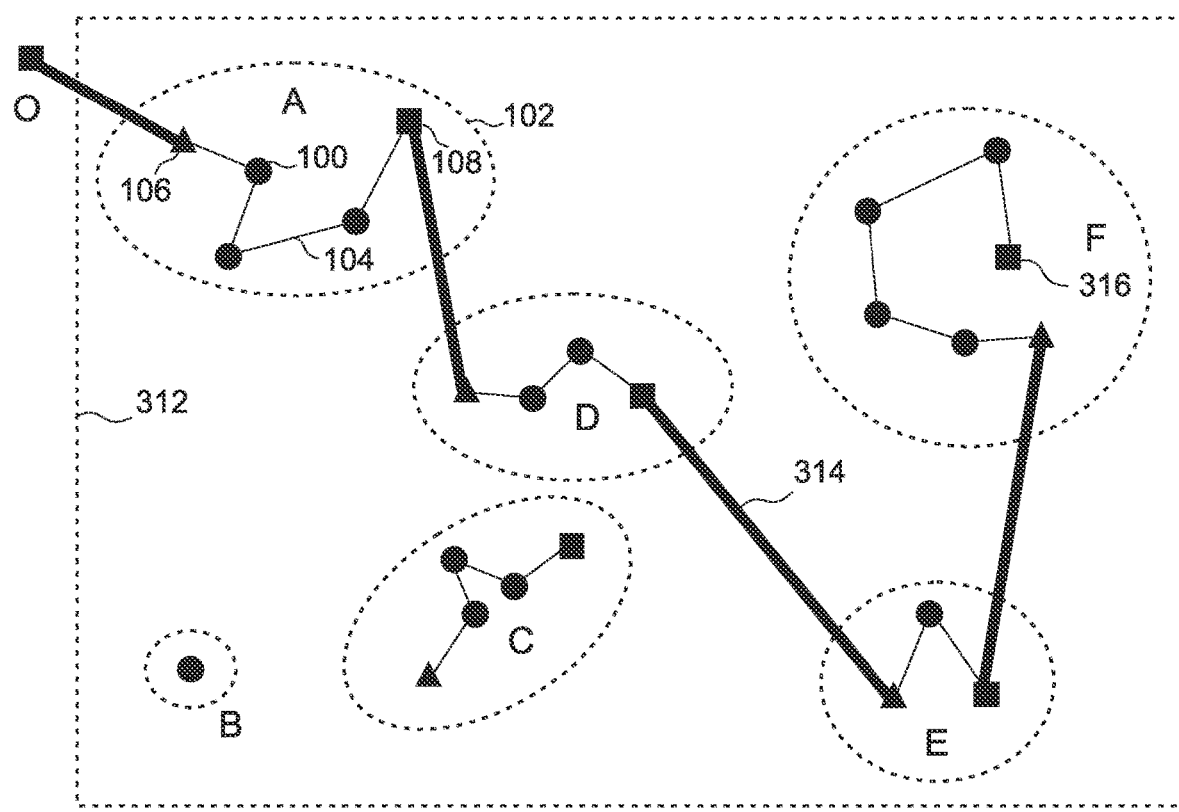
FIG. 3H illustrates including in a candidate sub-schedule only some of the groups that are included in a list according to an embodiment of the present disclosure.

It is notable that the strategies that are discussed above for determining group schedules, as illustrated in FIGS. 2A-2E, are also applicable to the process of selecting sub-schedules 314 at each step of the growth process. One difference is that group schedules are required to include all of the targets in the group, while sub-schedules 314 are not required to include all of the groups 102 in a list 312. FIGS. 3G and 3H present a comparison illustrating this point. In FIG. 3G, a group 102 that contains five targets a, b, c, d, e is examined, and group schedule 104 is assigned that includes all five of the targets 100. In comparison, in FIG. 3H, six groups 102, indicated as A, B, C, D, E, F, that are included in a list 312 are examined. However, only four of the groups 102 A, D, E, F are included in the sub-schedule 314.

Another difference between selecting group schedules and selecting sub-schedules is that all possible beginning targets are examined when selecting a group schedule, while sub-schedules are constrained to always begin with the ending state of the pending partial schedule.

As is noted above, it may not always be possible to include all of the groups 102 in a schedule 314. For example, it may not be possible to integrate a previously missed group 102 into a re-grown sub-schedule, while meeting all other sub-schedule requirements. In such cases, it may be necessary to exclude one or more groups 102 from the final pointing schedule. In other words, the pointing scheduler may be required to "settle" for a final pointing schedule that does not include the excluded group. At some point, if no partial schedule 314 can be found within a reasonable computation time that includes a certain group and meets all other requirements, the pointing device scheduler will exclude the non-included group, whereupon the growth process will continue without further consideration of the excluded group.

The disclosed process of growing, pruning, and excluding can be stated symbolically as follows. If a number is assigned to each successive partial schedule and list 312, and a letter is assigned to each of the sub-schedules 314 that are considered for each list 312, then a partial schedule resulting from four steps of growth can be represented as 1a 2a 3a 4a, where "2a" refers to the second partial schedule and to the "sub-schedule 314 "a" that was determined to be the "best" of the examined sub-schedules 314 for list 2. Accordingly, if the partial schedule 1a 2a 3a 4a fails to satisfy its applicable requirements, then as a first step the other previously examined sub-schedules for list 4 are considered for substitution. For example, a new partial schedule 1a 2a 3a 4b is considered to determine if it meets applicable requirements, followed by 1a 2a 3a 4c etc.

If it is found that none of the previously examined sub-schedules 314 for list 4 can enable partial schedule 4 to meet its requirements, then the partial schedule is pruned back one step, and a new partial schedule 3 is formed by selecting the "next best" sub-schedule for list 3. Specifically, new partial schedule 3 becomes 1a 2a 3b. Re-growth of the partial schedule back to partial schedule 4 is then attempted, where the previously examined list 4 either remains the same or may be modified, as discussed above. For example, the new partial schedule 4' could be 1a 2a 3b 4a.

If this process of pruning and regrowth fails to identify a partial schedule that satisfies its requirements and includes all groups 102 that cannot be included in any subsequent partial schedule, then it may be necessary to designate at least one group 102 as an excluded group. For example, so as to meet all requirements for the fourth partial schedule, it may be necessary to select a sub-schedule 314 that excludes a group 102 that cannot be included in any future growth steps, for example if the window of performance of the excluded group 102 does not extend beyond the cumulative execution time of the partial schedule, and no combination of pruning and regrowing steps can be found within a reasonable calculation time that can include the excluded group while meeting all other requirements.

The process of growing, pruning, and exclusion continues until all of the groups have been included in the schedule, or until some other terminating condition is encountered. For example, in a given embodiment the process may be halted when the total execution time of the schedule reaches or exceeds a defined maximum.

Figure 4A:
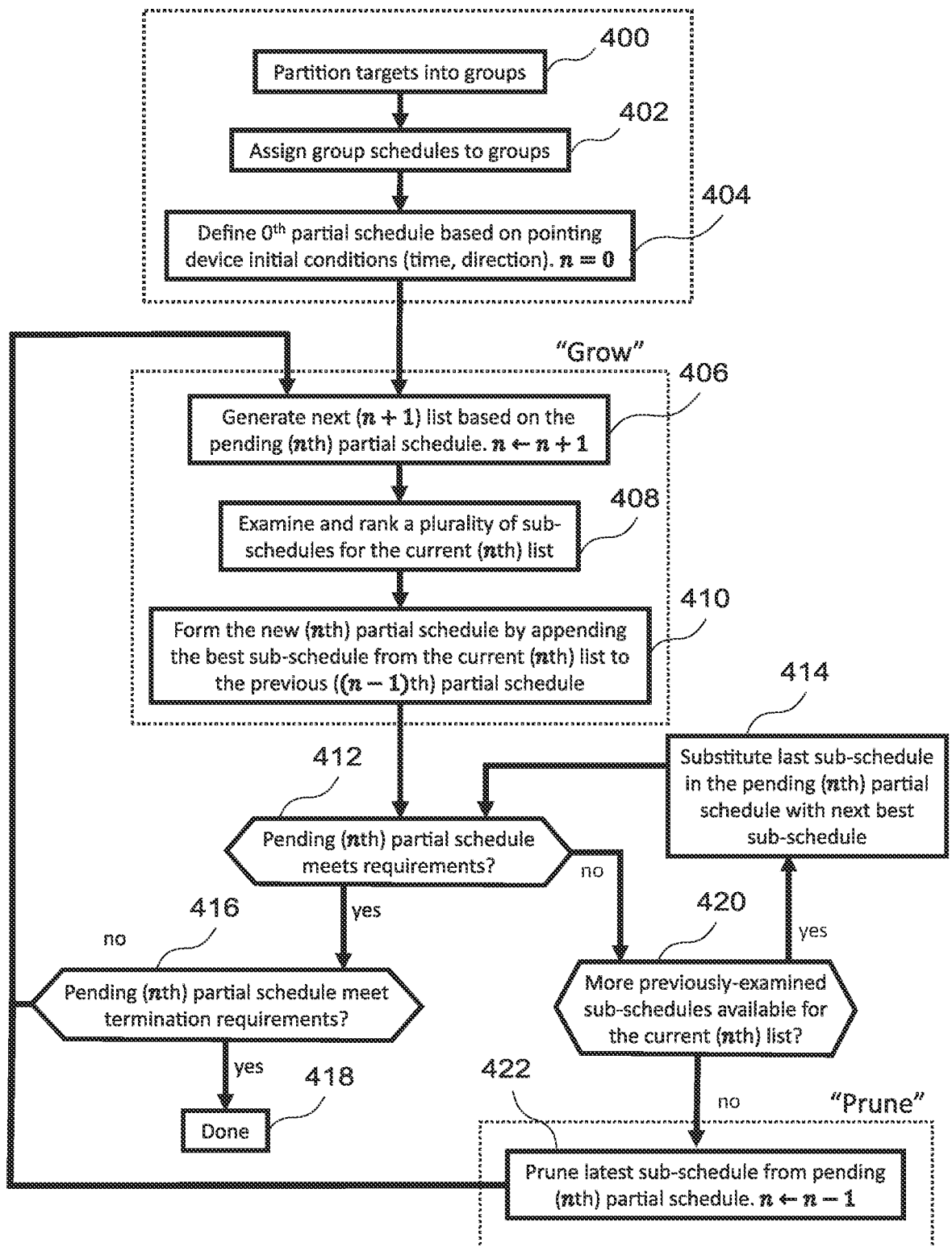
FIG. 4A is a flow diagram that illustrates an embodiment of the present disclosure that does not include the possibility of excluding groups from the full pointing schedule.
Figure 4B:
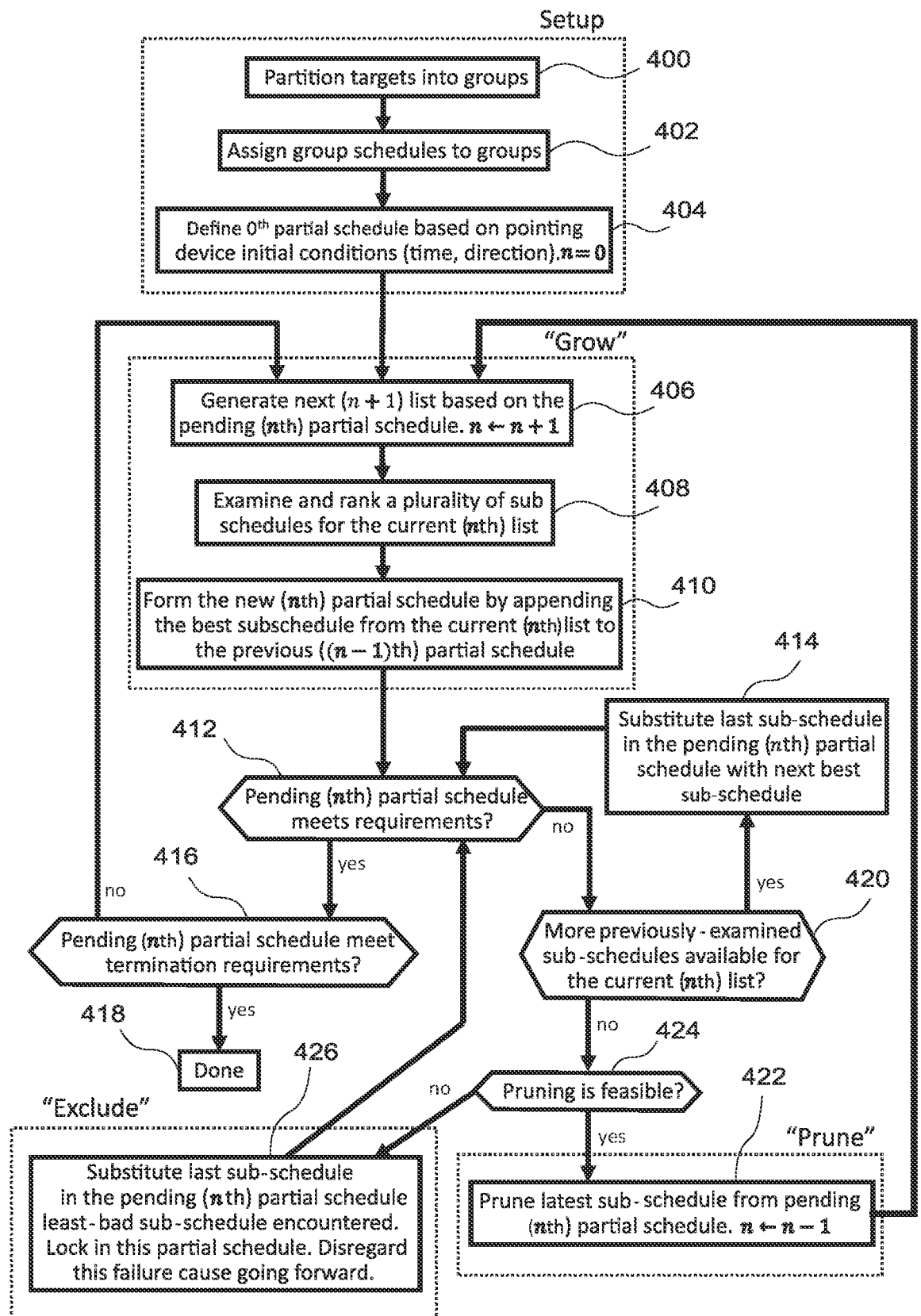
FIG. 4B is a flow diagram that illustrates an embodiment of the present disclosure that includes the possibility of excluding groups from the full pointing schedule.

The method of the present disclosure is summarized in the flow diagrams of FIGS. 4A and 4B. With reference to FIG. 4A, after selecting the groups 400, a group schedule 104 is assigned 402 to each of the groups 102. A zeroth partial schedule is also designated 404 to be the initial state of the pointing device, including the initial time and initial pointing direction of the pointing device.

One or more of the groups 102 is then included 406 in a "next" list 312 according to the pending partial schedule. Candidate sub-schedules that include at least some of the groups 102 in the list 312 are examined and ranked 408, and a "best" of the candidate sub-schedules 314 is appended 410 to the pending partial schedule to create a new, "grown" partial schedule.

If the grown partial schedule meets all of its requirements 412, then the growth process 406-410 is repeated, assuming that all of the groups are not already included in the partial schedule, and that no other terminating criteria such as a maximum execution time have been reached 416. If a terminating criterion is reached, then the scheduling process is ended 418.

If the grown partial schedule does not meet all of its requirements, then as a first step if there are other sub-schedules for the pending list that have not yet been tested 420, then the "next best" candidate sub-schedule is substituted in the pending partial schedule 414 to see if it can provide a growth step that will meet all applicable requirements 412. This process of sub-schedule substitution and re-appraisal 412, 414, 420 is repeated until either a compliant partial schedule is found, or the set of previously examined candidate sub-schedules is exhausted. If no such previously examined sub-schedule is found which meets all applicable requirements, then the partial schedule is pruned 422, and the growth process continues. It will be understood that if the pruning 422 fails to produce a partial schedule that meets its requirements, then additional pruning may be necessary.

It should be noted that in some implementations it may be necessary to execute the partial schedules "on the fly." In other words, execution of the pointing schedule may begin before the scheduling process has been completed. The present approach of incrementally growing a partial schedule is readily adapted to this scenario, with the primary impact being that pruning will be limited to only those sub-schedules that have not yet been executed.

As is mentioned above, it may not always be possible to include all of the groups of a pointing queue in a pointing schedule. In such cases, it may be necessary to "exclude" at least one group, whereby the final schedule will not include that group. For example, with reference to FIG. 4B, if at some point in the grow and prune process all of the partial schedules that have been considered fail to include a certain group, if further pruning is not feasible 424, for example if an earlier partial schedule has already been executed, and if it is clear that due to its windows of performance the missed group cannot be included by further growth of the partial schedule, then in embodiments the missed group is excluded from schedule, and the partial schedule is grown by appending to it the best, or "least bad" of the sub-schedules that have been considered 426, even though it does not include the missed group. The grown partial schedule is then "locked in," and the failure to include the excluded group is disregarded during the remainder of the scheduling process.

One of the advantages of the present method is that the groups 102 and the group schedules 104 remain invariant once they are initially established, thereby significantly reducing the schedule calculation time. Also, it is notable that the group schedules are determined independently of each other, and can therefore be determined in parallel, which may further reduce the computation time in a multi-processor system due to parallel processing.

It should also be noted that while the requirements that apply to the various partial schedules will generally ensure that the resulting schedule will be "acceptable," they do not guarantee, in embodiments, that the resulting schedule will be truly "optimal," i.e. substantially equal in "score" to a result that would be obtained by an exact analysis of the target queue as a whole.

In embodiments, if a target queue is to be repeated, but with some changes to the targets 102 and/or to the windows of performance, weights, etc., the process as described above is simply repeated for the modified target queue.

In various embodiments, the pointing device is a laser communication system, such as a ground-to-satellite laser communication system, satellite to ground, or satellite-to-satellite laser communication system; an astronomical telescope; a satellite imaging device; or an anti-ballistic laser system, such as an anti-ballistic system that employs a Risley prism high demand optical axis pointing device.

The foregoing description of the embodiments of the present disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the present disclosure to the precise form disclosed. Many modifications and variations are possible in light of this disclosure.

Although the present application is shown in a limited number of forms, the scope of the present disclosure is not limited to just these forms, but is amenable to various changes and modifications. The disclosure presented herein does not explicitly disclose all possible combinations of features that fall within the scope of the present disclosure. The features disclosed herein for the various embodiments can generally be interchanged and combined into any combinations that are not self-contradictory without departing from the scope of the present disclosure. In particular, the limitations presented in dependent claims below can be combined with their corresponding independent claims in any number and in any order without departing from the scope of this disclosure, unless the dependent claims are logically incompatible with each other.

We claim:

1. A system configured to direct a pointing device according to a pointing schedule, the system comprising a computing device configured to execute the steps of:
   partitioning a plurality of targets among a plurality of groups, each of the groups including at least one of the targets, at least one of the groups including a plurality of the targets;
   for each of the groups, assigning a group schedule to the group, said group schedule defining a series of pointing transitions between the targets included in the group, the group schedule thereby defining an order in which the targets of the group are to be included in the pointing schedule;
   defining an initial pointing direction as an initial partial schedule (0), the initial pointing direction being also designated as terminal state (0), where (0) indicates that an index (n) is equal to zero; and
   growing partial schedule (n) by:
   A) incrementing n such that n=n+1;
   B) appending to partial schedule (n−1) at least one of the groups that are not already included in partial schedule (n−1) so as to form partial schedule (n) having terminal state (n):

C) in response to partial schedule (n) meets applicable predetermined requirements, and if no predetermined terminating criterion is satisfied, repeating steps A) and B);

D) in response to partial schedule (n) does not meet the applicable predetermined requirements, pruning and regrowing partial schedule (n) by removing at least one of the previously appended groups from partial schedule (n) and replacing it with at least one other of the groups that are not included in partial schedule (n);

E) in response to the pruned and regrown partial schedule (n) meets the predetermined requirements, and when no terminating criterion is satisfied, then repeating steps A) through C), otherwise, repeating step D);

F) repeating steps A) through E) until n reaches a final value N for which at least one of the terminating criteria is satisfied, partial schedule (N) thereby being a full pointing schedule; and causing the pointing device to execute the full pointing schedule.

2. The system of claim 1, wherein distributing the targets into a plurality of groups includes distributing the targets into the groups at least in part according to relative linear or angular separations between the targets.

3. The system of claim 1, wherein:
a corresponding value applies to each of the targets; and
distributing the targets into the plurality of groups includes distributing the targets into the groups at least in part according to their values.

4. The method of claim 1, wherein:
a corresponding window of performance applies to each of the targets, such that pointing of the pointing device at the target is only possible during its window of performance;
a corresponding window of performance applies to each of the groups, wherein the pointing device must point at the beginning target of the group schedule of the group during the window of performance of the group so as to enable the pointing device, when executing the group schedule of the group, to point at each of the targets of the group during the target's window of performance; and
at least one of:
the targets are distributed into the plurality of groups at least in part according to their windows of performance;
the group schedules are assigned to the groups at least in part due to the windows of performance of the targets in the groups;
one of the predetermined requirements in steps C), D), and E) requires that for each of the groups in partial schedule (n), pointing at the group is scheduled begins within the window of performance of the group; and
one of the predetermined requirements in steps C), D), and E) requires that none of the groups that are not included in partial schedule (n) is a "missed" group having a window of performance that does not extend beyond a hypothetical ending time of partial schedule (n).

5. The method of claim 4, wherein if a group is missed by all partial schedules (n) that can be generated by step D) within a specified calculation time, the missed group is excluded from the plurality of groups and from the applicable criteria, and is not included in the full pointing schedule.

6. The method of claim 1, wherein the group schedules are assigned to the groups according to a strategy that is one of:
exact;
random;
repeat split;
relative pare; and
absolute pare.

7. The method of claim 1, wherein in steps C), E), and F), one of the terminating criteria is that all of the groups are included in partial schedule (n), such that partial schedule (n) is a complete pointing schedule.

8. The method of claim 1, wherein:
a corresponding dwell time applies to each of the targets;
a corresponding slew time applies to each possible pointing transition between two of the targets;
for each value of (n), a dwell time of partial schedule (n) is equal to a sum of the dwell times of the groups included in partial schedule (n) and a sum of the slew times of the pointing transitions between the groups included in partial schedule (n); and
one of the terminating criteria in steps C), E), and F) is that the dwell time of partial schedule (n) equals or exceeds a specified maximum schedule dwell time.

9. The method of claim 1, wherein:
a corresponding dwell time applies to each of the targets;
a corresponding slew time applies to each possible pointing transition between two of the targets;
for each value of (n), a dwell time of partial schedule (n) is equal to a sum of the dwell times of the groups included in partial schedule (n) and a sum of the slew times of the pointing transitions between the groups included in partial schedule (n); and
one of the terminating criteria in steps C), E), and F) is that the dwell time of partial schedule (n) equals or exceeds a specified maximum schedule dwell time.

10. The method of claim 1, wherein executing the full pointing schedule does not cause the pointing device to point at all of the groups in the plurality of groups.

11. The method of claim 1, wherein causing the pointing device to execute the full pointing schedule includes causing the pointing device to begin executing one of the partial schedules before n has reached its final value N in step F).

12. The system of claim 1, wherein step B) comprises:
a) generating a list (n) of groups that are not included in partial schedule (n-1);
b) identifying at least one candidate sub-schedule for list (n), each of the candidate sub-schedules including at least one of the groups in list (n), each of the candidate sub-schedules that includes more than one group defining a series of pointing transitions between the groups included in the sub-schedule;
c) selecting from the at least one candidate sub-schedule for list (n) a first sub-schedule (n) having first terminal state (n); and
d) appending first sub-schedule (n) to partial schedule (n-1), thereby growing partial schedule (n-1) to become partial schedule (n) having terminal state (n)=first terminal state (n).

13. The system of claim 12, wherein step D) comprises:
e) in response to partial schedule (n) fails to meet at least one of the predetermined requirements, removing first sub-schedule (n) from partial schedule (n), thereby reverting partial schedule (n) to partial schedule (n−1); and
f) in response to possible, appending to sub-schedule (n−1) a second sub-schedule (n) that was not previously selected from among the candidate sub-schedules for list (n), second sub-schedule (n) including at least one of the groups in list (n) and having a second terminal state (n), thereby regrowing partial schedule (n−1) to become revised partial schedule (n) having terminal state (n)=second terminal state (n).

14. The system of claim 13, wherein step D) further comprises, in response to revised partial schedule (n) resulting from step f) fails to meet at least one of the applicable criteria:
g) repeating steps e) and f); and
h) in response to all of the predetermined requirements cannot be met by repeating steps e) and f), and when n is greater than 1, pruning and regrowing partial schedule (n−1) by:
1) removing the groups that were appended to partial schedule (n−1), thereby reverting partial schedule (n) to partial schedule (n−1);
2) removing the groups that were previously appended to partial schedule (n−2), thereby reverting partial schedule (n−1) to partial schedule (n−2);
3) appending to partial schedule (n−2) a second sub-schedule (n−1) that was not previously selected from among the candidate sub-schedules for list (n−1), thereby re-growing partial schedule (n−2) to become revised partial schedule (n−1); and
4) repeating steps A) through F).

15. The method of claim 12, wherein in step b) the candidate sub-schedules are identified according to a strategy that is one of:
exact;
random;
repeat split;
relative pare; and
absolute pare.

16. The system of claim 12, wherein:
a corresponding value applies to each of the targets;
for each of the groups, a value of the group is equal to a sum of the values of the targets that are included in the group;
for each of the sub-schedules, a value of the sub-schedule is equal to a sum of the values of the groups included in the sub-schedule; and
in step c) the first sub-schedule (n) is selected according to the values of the sub-schedules for list (n).

17. The method of claim 12, wherein:
a corresponding dwell time applies to each of the targets;
a corresponding slew time applies to each possible pointing transition between two of the targets;
for each of the groups, a dwell time of the group is equal to a sum of the dwell times of the targets in the group plus a sum of the slew times of the pointing transitions included in the group schedule of the group;
for each possible pointing transition between a first of the groups and a second of the groups, a corresponding slew time is equal to the slew time from the ending target of the group schedule of the first group to the beginning target of the group schedule of the second group;
for each of the sub-schedules, a dwell time of the sub-schedule is equal to a sum of the dwell times of the groups included in the sub-schedule and a sum of the slew times of the pointing transitions between the groups included in the sub-schedule; and
in step c), first sub-schedule (n) is selected according to the dwell times of the sub-schedules for list (n).

18. The method of claim 12, wherein:
a corresponding window of performance applies to each of the targets, such that pointing of the pointing device at the target is only possible during its window of performance;
a corresponding window of performance applies to each of the groups, wherein the pointing device must point at the beginning target of the group schedule of the group during the window of performance of the group so as to enable the pointing device, when executing the group schedule of the group, to point at each of the targets of the group during the target's window of performance; and
at least one of:
in step a) the list (n) of groups is generated at least in part due to the windows of performance of the groups; and
in step b) the groups are included in the candidate sub-schedules at least in part due to the windows of performance of the groups.

19. The method of claim 12, wherein:
a corresponding window of performance applies to each of the targets, such that pointing of the pointing device at the target is only possible during its window of performance;
a corresponding window of performance applies to each of the groups, wherein the pointing device must point at the beginning target of the group schedule of the group during the window of performance of the group so as to enable the pointing device, when executing the group schedule of the group, to point at each of the targets of the group during the target's window of performance; and
in step c) selecting first sub-schedule (n) includes rejecting all candidate sub-schedules that do not direct the pointing device at each of the groups of the candidate sub-schedule within the window of performance of that group.

20. A defense system comprising a computing device configured to execute instructions that cause the computing device to determine and execute a pointing schedule of the defense system by executing the steps of:
partitioning a plurality of targets among a plurality of groups, each of the groups including at least one of the targets, at least one of the groups including a plurality of the targets;
assigning a group schedule to each of the groups, said group schedule defining a series of pointing transitions between the targets included in the group, the group schedule thereby defining an order in which the targets of the group are to be included in the pointing schedule;
defining an initial pointing direction as a partial schedule; and
growing the partial schedule incrementally by appending to the partial schedule at least one of the groups that are not already included in the partial schedule, while ensuring that the grown partial schedule meets applicable predetermined requirements;
repeating the growing until a predetermined terminating criterion is satisfied, thereby producing a full pointing schedule; and
causing the defense system to execute the full pointing schedule.

21. A computer program product including one or more non-transitory machine-readable mediums having instructions encoded thereon that, when executed by at least one processor, cause a process to be carried out, the process comprising:

partitioning a plurality of targets among a plurality of groups, each of the groups including at least one of the targets, at least one of the groups including a plurality of the targets;

assigning a group schedule to each of the groups, said group schedule defining a series of pointing transitions between the targets included in the group, the group schedule thereby defining an order in which the targets of the group are to be included in the pointing schedule;

defining an initial pointing direction as a partial schedule; and growing the partial schedule incrementally by appending to the partial schedule at least one of the groups that are not already included in the partial schedule, while ensuring that the grown partial schedule meets applicable predetermined requirements;

repeating the growing until a predetermined terminating criterion is satisfied, thereby producing a full pointing schedule; and causing a pointing device to execute the full pointing schedule.

* * * * *